(12) United States Patent
Kumar et al.

(10) Patent No.: US 10,298,616 B2
(45) Date of Patent: May 21, 2019

(54) APPARATUS AND METHOD OF SECURING NETWORK COMMUNICATIONS

(71) Applicant: 128 Technology, Inc., Burlington, MA (US)

(72) Inventors: Prashant Kumar, Andover, MA (US); Patrick J. McLampy, Dunstable, MA (US); Patrick Timmons, Newton, MA (US)

(73) Assignee: 128 Technology, Inc., Burlington, MA (US)

( * ) Notice: Subject to any disclaimer, the term of this patent is extended or adjusted under 35 U.S.C. 154(b) by 13 days.

(21) Appl. No.: 15/165,211

(22) Filed: May 26, 2016

(65) Prior Publication Data
US 2017/0346854 A1    Nov. 30, 2017

(51) Int. Cl.
*H04L 29/06*    (2006.01)
*H04W 12/02*    (2009.01)

(52) U.S. Cl.
CPC ........ *H04L 63/168* (2013.01); *H04L 63/0428* (2013.01); *H04L 63/164* (2013.01); *H04L 63/166* (2013.01); *H04W 12/02* (2013.01)

(58) Field of Classification Search
None
See application file for complete search history.

(56) References Cited

U.S. PATENT DOCUMENTS 6,330,602 B1 * 12/2001 Law .................. H04L 67/1095
                                                 370/401
6,515,963 B1    2/2003 Bechtolsheim et al. ...... 370/229
(Continued)

FOREIGN PATENT DOCUMENTS

CN    101552703 A    10/2009
CN    101646220 A    2/2010
(Continued)

OTHER PUBLICATIONS

International Searching Authority, International Search Report—International Application No. PCT/US2017/029399, dated Aug. 14, 2017, together with the Written Opinion of the International Searching Authority, 9 pages.
(Continued)

*Primary Examiner* — Amir Mehrmanesh
(74) *Attorney, Agent, or Firm* — Nutter McClennen & Fish LLP

(57) ABSTRACT

An apparatus and/or method secures session communications between a first network (having a first encryption device configured to encrypt at least some session communications from the first network to the second network) and a second network. The apparatus and/or method receive, at the first network, given session packets of a given session between the first and second networks, and determine that at least one of the received given session packets is encrypted ("encrypted given session packet"). The given session involves a Layer 7 application that encrypted the at least one encrypted given session packet. Next, the apparatus and/or method controls, in response to determining that the given session packet is encrypted, the first encryption device to permit communication of the given session with the second network without further encrypting a plurality of the encrypted given session packets. Preferably, the first encryption device encrypts none of the given session packets.

19 Claims, 23 Drawing Sheets

(56) References Cited

U.S. PATENT DOCUMENTS

| | | |
|---|---|---|
| 6,563,824 B1 | 5/2003 | Bhatia et al. |
| 6,584,071 B1 | 6/2003 | Kodialam et al. |
| 6,721,334 B1 | 4/2004 | Ketcham ................ 37/465 |
| 6,738,387 B1 | 5/2004 | Lin et al. ............... 370/429 |
| 6,778,531 B1 | 8/2004 | Kodialam et al. |
| 6,798,743 B1 | 9/2004 | Ma et al. |
| 7,020,143 B2 | 3/2006 | Zdan |
| 7,035,214 B1 | 4/2006 | Seddigh et al. |
| 7,106,739 B2 | 9/2006 | Beier |
| 7,154,902 B1 | 12/2006 | Sikdar |
| 7,218,632 B1 | 5/2007 | Bechtolsheim et al. |
| 7,315,541 B1 | 1/2008 | Housel et al. |
| 7,373,660 B1 | 5/2008 | Guichard et al. |
| 7,466,703 B1 | 12/2008 | Arunachalam et al. |
| 7,536,720 B2 | 5/2009 | Burdett et al. |
| 7,634,805 B2 | 12/2009 | Aroya |
| 7,706,411 B2 | 4/2010 | Wakumoto et al. |
| 7,730,301 B2 | 6/2010 | Correll et al. |
| 7,773,611 B2 | 8/2010 | Booth, III et al. |
| 7,872,973 B2 | 1/2011 | Sterne et al. |
| 8,068,417 B1 | 11/2011 | Roberts ................ 370/230 |
| 8,094,560 B2 | 1/2012 | Bagepalli et al. |
| 8,139,479 B1 | 3/2012 | Raszuk |
| RE44,119 E | 4/2013 | Wang et al. |
| 8,437,248 B2 | 5/2013 | Li et al. |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,634,428 B2 | 1/2014 | Le Pennec et al. |
| 8,804,489 B2 | 8/2014 | Lu et al. |
| 8,942,085 B1 | 1/2015 | Pani et al. |
| 8,989,020 B2 | 3/2015 | So |
| 9,059,920 B2 | 6/2015 | Ravindran et al. |
| 9,160,652 B2 | 10/2015 | Taillon et al. |
| 9,240,953 B2 | 1/2016 | Carlstrom |
| 9,276,864 B1 | 3/2016 | Vincent |
| 2001/0030649 A1 | 10/2001 | Mamiya et al. ............ 345/530 |
| 2002/0044553 A1 | 4/2002 | Chakravorty ............. 370/392 |
| 2002/0075883 A1 | 6/2002 | Dell et al. ................ 370/413 |
| 2002/0174194 A1* | 11/2002 | Mooney ............... H04L 51/36 709/219 |
| 2002/0176363 A1 | 11/2002 | Durinovic-Johri et al. |
| 2003/0198189 A1 | 10/2003 | Roberts et al. ............ 370/252 |
| 2003/0214938 A1 | 11/2003 | Jindal et al. |
| 2004/0088542 A1 | 5/2004 | Daude et al. |
| 2004/0264481 A1 | 12/2004 | Darling et al. ............ 370/401 |
| 2005/0036616 A1 | 2/2005 | Huang et al. |
| 2005/0063307 A1 | 3/2005 | Samuels et al. ........... 370/235 |
| 2005/0182932 A1 | 8/2005 | Wheeler |
| 2005/0238022 A1 | 10/2005 | Panigrahy ................ 370/392 |
| 2006/0176894 A1 | 8/2006 | Oh et al. |
| 2007/0171825 A1 | 7/2007 | Roberts et al. ............ 370/235 |
| 2007/0171826 A1 | 7/2007 | Roberts et al. ............ 370/235 |
| 2008/0214175 A1 | 9/2008 | Papadoglou et al. |
| 2009/0007021 A1 | 1/2009 | Hayton |
| 2009/0059958 A1 | 3/2009 | Nakata ................... 370/474 |
| 2010/0125898 A1 | 5/2010 | Dubuc et al. |
| 2010/0191968 A1 | 7/2010 | Patil et al. |
| 2012/0144061 A1 | 6/2012 | Song |
| 2012/0224477 A1 | 9/2012 | Balasubramanian et al. |
| 2012/0236860 A1 | 9/2012 | Kompella et al. |
| 2013/0227166 A1 | 8/2013 | Ravindran et al. .......... 709/238 |
| 2013/0297824 A1 | 11/2013 | Lan et al. |
| 2014/0029442 A1* | 1/2014 | Wallman ............. H04L 69/22 370/241.1 |
| 2014/0040488 A1 | 2/2014 | Small et al. |
| 2014/0256286 A1* | 9/2014 | Rangarajan ........... H04W 12/00 455/410 |
| 2015/0188814 A1 | 7/2015 | Jain et al. |
| 2015/0229618 A1 | 8/2015 | Wan et al. |
| 2015/0358237 A1* | 12/2015 | Persson ............... H04W 48/18 370/235 |
| 2015/0381324 A1 | 12/2015 | Mirsky et al. |
| 2016/0088112 A1* | 3/2016 | Kim ................ H04L 12/2834 709/213 |
| 2016/0094444 A1 | 3/2016 | MeLampy et al. ...... H04L 45/74 |
| 2017/0150403 A1* | 5/2017 | Persson .............. H04W 28/24 |
| 2017/0214691 A1* | 7/2017 | McCann ............ H04L 63/0435 |

FOREIGN PATENT DOCUMENTS

| | | | |
|---|---|---|---|
| CN | 101068242 B | 4/2010 | |
| CN | 102158371 A | 8/2011 | |
| CN | 101640629 B | 8/2012 | |
| CN | 102739507 A | 10/2012 | |
| CN | 101207604 B | 3/2013 | |
| CN | 102769679 B | 6/2015 | |
| CN | 103179192 B | 11/2015 | |
| CN | 105245469 A | 1/2016 | |
| EP | 1313267 B1 | 12/2006 | ............ H04L 12/56 |
| KR | 10-2011-0062994 A | 6/2011 | |
| WO | WO 2007/084707 A2 | 7/2007 | ............... H04J 1/16 |
| WO | WO 2007/084755 A2 | 7/2007 | ............... H04J 1/16 |
| WO | WO 2008/043230 A1 | 4/2008 | |
| WO | WO 2015/131537 A1 | 9/2015 | |
| WO | WO 2016/007052 A1 | 1/2016 | |

OTHER PUBLICATIONS

Caida, "Observing routing asymmetry in Internet traffic," www.caida.org/research/traffic-analysis/asymmetry, 7 pages, Jul. 17, 2013.
Chiosi et al., "Network Functions Virtualisation," SDN and OpenFlow World Congress, Darmstadt-Germany, http://portal.etsi.org/nfv/nfv white_paper.pdf, 16 pages, Oct. 22, 2012.
Davis, "Layer 3 Switches Explained," Happy Router, 6 pages, Aug. 30, 2007.
Flisfils et al., "Segment Routing Architecture," Network Working Group, Internet-Draft, 28 pages, Oct. 2013.
Herbert, "xps: Transmit Packet Steering," Eklektix, Inc., 12 pages, Oct. 26, 2010.
Iana, "Transmission Control Protocol (TCP) Parameters," www.iana.org/assignments/tcp-parameters/tcp-parameters.xhtml, 5 pages, Sep. 22, 2014.
Klement, "1.2 Overview of a TCP communications session," RPG IV Socket Tutorial, http://www.scottklement.com/rpg/socketut/overview.html, 2 pages, 2001.
PC Magazine, "Definition of: TCP/IP abc's," PC Magazine Encyclopedia, www.pcmag.com/encyclopedia/term/52615/tcp-ip-abc-s, 5 pages, 2005.
Previdi et al., "IPv6 Segment Routing Header (SRH)," Network Working Group, Internet-Draft, 24 pages, Jul. 2014.
Roberts, "The Next Generation of IP—Flow Routing," SSGRR 2003S International Conference, L'Aquila Italy, 11 pages, Jul. 29, 2003.
Rouse, "routing table," What is routing table?—Definition from WhatIs.com, http://searchnetworking.techtarget.com/definition/routing-table, 5 pages, Apr. 7, 2007.
Shang et al., "Making Better Use of All Those TCP ACK Packets," Computer Science Department, Worcester Polytechnic Institute, 10 pages, 2005.
Wikipedia, "Equal-cost Multi-path routing," 1 page, Sep. 13, 2013.
Wikipedia, "LAN switching," 5 pages, Jun. 12, 2013.
Wikipedia, "Management information base," 6 pages, Jul. 15, 2013.
Wikipedia, "Network address translation," 11 pages, Sep. 24, 2013.
Wikipedia, "Network socket," 4 pages, Sep. 19, 2013.
Wikipedia, "Open vSwitch," 2 pages, Nov. 24, 2013.
Wikipedia, "Reverse path forwarding," 3 pages, Jul. 31, 2013.
Wikipedia, "Router (computing)," 8 pages, Sep. 23, 2013.
Wikipedia, "Software-defined networking," 6 pages, Sep. 16, 2013.
Wikipedia, "Transmission Control Protocol," 18 pages, Sep. 16, 2013.
International Searching Authority, International Search Report—International Application No. PCT/US2015/044815, dated Dec. 6, 2015 together with the Written Opinion of the International Searching Authority, 8 pages.
International Searching Authority, International Search Report—International Application No. PCT/US2015/060840, dated Mar. 8,

(56) References Cited

OTHER PUBLICATIONS 2016, together with the Written Opinion of the International Searching Authority, 13 pages.

Berners-Lee et al., *Uniform Resource Identifier (URI): Generic Syntax*, Network Working Group, Request for Comments 3986, The Internet Society, 61 pages, Jan. 2005.

Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.

Cisco Systems, *Parallel Express Forwarding on the Cisco 10000 Series*, (White Paper) Cisco Systems, printed Jun. 17, 2015, 4 pages.

Data Plane Development Kit, *Programmer's Guide, Release 16.04.0*, 216 pages, Apr. 12, 2016.

Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.

Katz et al., *Bidirectional Forwarding Detection (BFD)*, Internet Engineering Task Force (IETF), Request for Comments 5880, ISSN: 2070-1721, Juniper Networks, 49 pages, Jun. 2010.

Microsoft, *Introduction to Receive Side Scaling*, Developer Resources, https://msdn.microsoft.com/en-us/library/windows/hardware/ff556942(v=vs.85).aspx, 3 pages, Apr. 2014.

Microsoft, *RSS with a Single Hardware Receive Queue*, Developer Resources, https://msdn.microsoft.com/en-us/library/windows/hardware/ff570727(v=vs.85).aspx, 2 pages, Jan. 2015.

Microsoft, *RSS with Hardware Queuing*, Developer Resources, https://msdn.microsoft.com/en-us/library/windows/hardware/ff570728(v=vs.85).aspx, 2 pages, Jan. 2015.

Microsoft, *Non-RSS Receive Processing*, Developer Resources, https://msdn.microsoft.com/en-us/library/windows/hardware/ff568798(v=vs.85).aspx, 2 pages, Jan. 2015.

Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.

Sollins et al. *Functional Requirements for Uniform Resource Names*, Network Working Group, Request for Comments 1737, 7 pages, Dec. 1994.

Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.

Wikipedia, *Active queue management*, https://en.wikipedia.org/wiki/Active_queue_management, 2 pages, Apr. 22, 2015.

Wikipedia, *Network interface controller*, https://en.wikipedia.org/wiki/Network_interface_controller,5 pages, May 19, 2015.

International Searching Authority, International Search Report—International Application No. PCT/US2016/013416, dated Jun. 8, 2016, together with the Written Opinion of the International Searching Authority, 12 pages.

International Searching Authority, International Search Report—International Application No. PCT/US2016/026938, dated Jul. 28, 2016, together with the Written Opinion of the International Searching Authority, 9 pages.

\* cited by examiner

AIPR 1  708

Session X

Return Association (RA)

SSA   1.1.1.1

SSP   10

SDA   5.5.5.5

SDP   20

SPR   100

Forward Association (FA)

SSA   2.2.2.2        (implicit)

SSP   30           (session source port assigned by AIPR 1  708)

SDA   3.3.3.3        (next node address - AIPR 2  714)

SDP   40           (session destination port assigned by AIPR 1  708)

SPR   100

Flag = First Waypoint AIPR

Session Y

RA

FA

Flag

Session Z

RA

FA

Flag

*FIG. 9*

AIPR 2   714

Session X

Return Association (RA)

SSA   2.2.2.2

SSP   30

SDA   3.3.3.3      (implicit)

SDP   40

SPR   100

Forward Association (FA)

SSA   3.3.3.3      (implicit)

SSP   50          (session source port assigned by AIPR 2  714)

SDA   4.4.4.4      (next node address - AIPR 4  722)

SDP   60          (session destination port assigned by AIPR 2  714)

SPR   100

Flag = Intermediate Waypoint AIPR

Session Y

RA

FA

Flag

Session Z

RA

FA

Flag

*FIG. 10*

AIPR 4    722

Session X

Return Association (RA)

SSA   3.3.3.3

SSP   50

SDA   4.4.4.4      (implicit)

SDP   60

SPR   100

Forward Association (FA)

SSA   1.1.1.1      (original source address from metadata)

SSP   10         (original source port from metadata)

SDA   5.5.5.5      (original destination address from metadata)

SDP   20         (original destination port from metadata)

SPR   100

Flag = Final Waypoint AIPR

Session Y

RA

FA

Flag

Session Z

RA

FA

Flag

*FIG. 11*

TLS Hello Packet

APPARATUS AND METHOD OF SECURING NETWORK COMMUNICATIONS

RELATED APPLICATIONS

This patent application is related to the following pending patent applications, the disclosures of which are incorporated herein, in their entireties, by reference:

U.S. patent application Ser. No. 14/497,954, filed Sep. 26, 2014, entitled, "Network Packet Flow Controller,", and U.S. patent application Ser. No. 14/562,917, filed Dec. 8, 2014, entitled, "Stateful Load Balancing in a Stateless Network,".

FIELD OF THE INVENTION

The invention generally relates to network devices and, more particularly, the invention relates to security for network routing devices

BACKGROUND OF THE INVENTION

The Internet Protocol ("IP") serves as the de-facto standard for forwarding data messages ("datagrams") between network devices connected with the Internet. To that end, IP delivers datagrams across a series of Internet devices, such as routers and switches, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet. Many people thus analogize packets to a traditional letter using first class mail, where the letter functions as the payload, and the envelope, with its return and mailing addresses, functions as the IP header.

When routing packets across a public or private network, there often is a risk that a person or device in that network may attempt to access and/or modify those packets. To counter this threat and maintain confidentiality, those in the art have deployed a number of encryption protocols that cooperate with IP to more securely transmit packets between network devices across the Internet.

SUMMARY OF VARIOUS EMBODIMENTS

In accordance with one embodiment of the invention, an apparatus and/or method secures session communications between a first network (having a first encryption device configured to encrypt at least some session communications from the first network to the second network) and a second network. To that end, the apparatus and/or method receive, at the first network, given session packets of a given session between the first and second networks, and determine that at least one of the received given session packets is encrypted ("encrypted given session packet"). The given session involves a Layer 7 application that encrypted the at least one encrypted given session packet. Next, the apparatus and/or method controls, in response to determining that the given session packet is encrypted, the first encryption device to permit communication of the given session with the second network without further encrypting a plurality of the encrypted given session packets. Preferably, the first encryption device encrypts none of the given session packets.

By controlling the encryption device to permit communication in the noted manner, the method and apparatus prevent double encryption of the at least one encrypted given session packet. Among other things, the first encryption device may include an edge router.

In a manner similar to the first network, the second network may have a second encryption device to encrypt communication from the second network to the first network. In that case, in response to determining that at least one of the received given session packets is encrypted, the method and apparatus similarly may control the second encryption device to permit communication of the given session to the first network without further encrypting at least some of the encrypted given session packets.

In some instances, the first encryption device is configured to normally encrypt communications between the first network and the second network. Thus, the method and apparatus may override the normal encryption configuration to permit communication of the given session to the second network without further encrypting at least some of the encrypted given session packets. The given session packets determined to be encrypted may comply with any of a variety of known encryption protocols, such as IPSec or Transport Layer Security.

By receiving the given session packets, the method and/or apparatus may initiate communication between the first network and the second network, and receive an initial encrypted given session packet having protocol data relating to a given encryption protocol. The method and/or apparatus then may determine that the noted packet is encrypted by reading the protocol data relating to the given encryption protocol in the initial encrypted given session packet. This process may be used with the Transport Layer Security protocol. As a second example, when using another encryption protocol, such as the IPSec protocol, the encrypted given session packets may have a header with encryption information. In that case, the method and/or apparatus may simply locate and read the encryption information in the header.

Although not necessary in some embodiments, the given session preferably is a stateful session. Moreover, the first network preferably received the at least one encrypted given session packet from the second network, and the Layer 7 application executes on at least one device in the first network.

In accordance with another embodiment of the invention, an apparatus also secures session communications between a first network and a second network. In a manner similar to the above noted method and/or apparatus, the first network has a first encryption device configured to encrypt at least some session packets from the first network to the second network. Among other things, the apparatus has an interface for receive (at the first network) from a Layer 7 application given session packets of a given session between the first and second networks. The apparatus also has a parser operatively coupled with the interface. The parser is configured to determine if at least one of the received given session packets is encrypted ("encrypted given session packet"). The apparatus further has a controller operatively coupled with the parser. The controller is configured to control (in response to determining by the parser) the first encryption device to permit communication of the given session with the second network without further encrypting a plurality of the encrypted given session packets.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 9 is a schematic diagram showing session-related data associated with an AIPR 1 based on the lead packet processing of FIG. 8.

FIG. 10 is a schematic diagram showing session-related data associated with another AIPR based on the lead packet processing of FIG. 8.

FIG. 11 is a schematic diagram showing session-related data associated with yet another AIPR based on the lead packet processing of FIG. 8.

FIG. 24 illustrates an example of a TLS Hello Packet.

DESCRIPTION OF ILLUSTRATIVE EMBODIMENTS

Illustrative embodiments ensure that previously encrypted packets of a session are not re-encrypted, thus improving end-to-end performance between two networks. To that end, a parser determines if a received packet for a new session has encrypted packets. If the new session has encrypted packets, then a controller ensures that its network does not re-encrypt packets of that session (i.e., the controller aims to prevent double encryption). For example, an edge router of a network may normally encrypt some or all sessions between two networks. If a new session already has encrypted packets (e.g., the session has packets encrypted by an application layer entity, such as an application executing on a computer), then the edge router will not re-encrypt those session packets.

If, however, the new session has no encrypted packets, then the controller permits the network to encrypt packets of that session in accordance with its normal processes. Accordingly, absent other reasons not to do so, the noted edge router would be free to encrypt packets of the new session. Details of illustrative embodiments are discussed below.

Networks

Illustrative embodiments preferably are implemented on a conventional computer network. Among other things, a network includes at least two nodes and at least one link between the nodes. Nodes can include computing devices (sometimes referred to as hosts or devices) and routers. Computers include personal computers, smart phones, automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. For example, nodes in a network may be within a single device, such as instances of a router inside a hardware router, and/or nodes in the Internet (e.g., routers) as discussed below. Many networks also include switches, which are largely transparent for purposes of this discussion. However, some switches also perform routing functions. For the present discussion, such routing switches are considered routers. Routers are described below.

Figure 1:
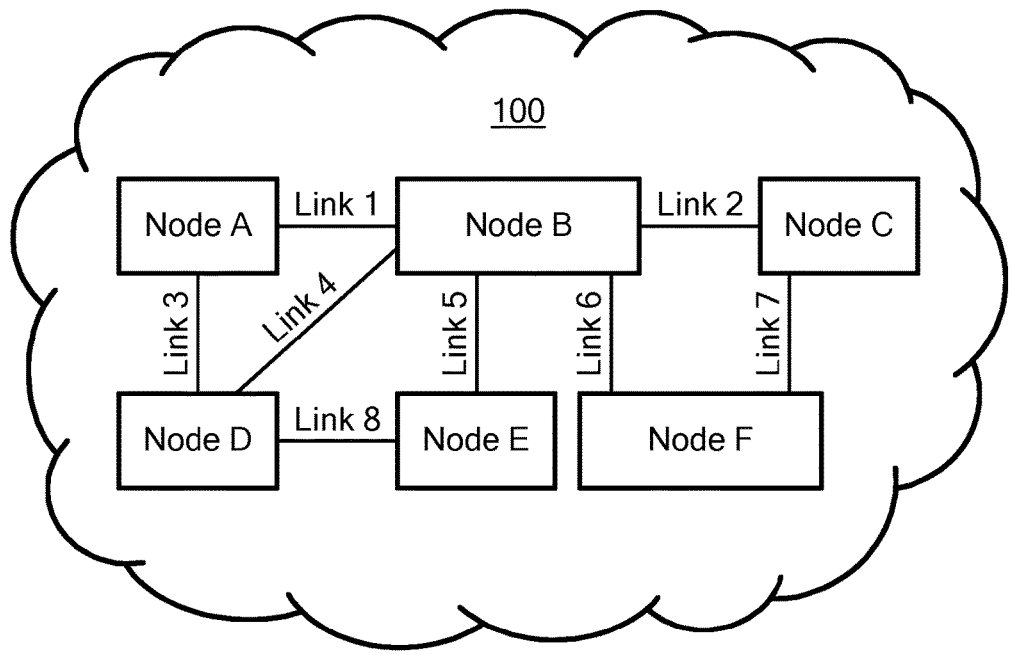
FIG. 1 schematically shows a hypothetical prior art network that may implement illustrative embodiments of the invention.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Node A, Node B, Node C . . . Node F and all the links 1-8 together make up a network 100. For simplicity, a network is depicted as a cloud or as being enclosed within a cloud.

Nodes initiate communications with other nodes via the network, and nodes receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other nodes. For example, Node D may send a message to Node F via Node B. Using well known networking protocols, the node (s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
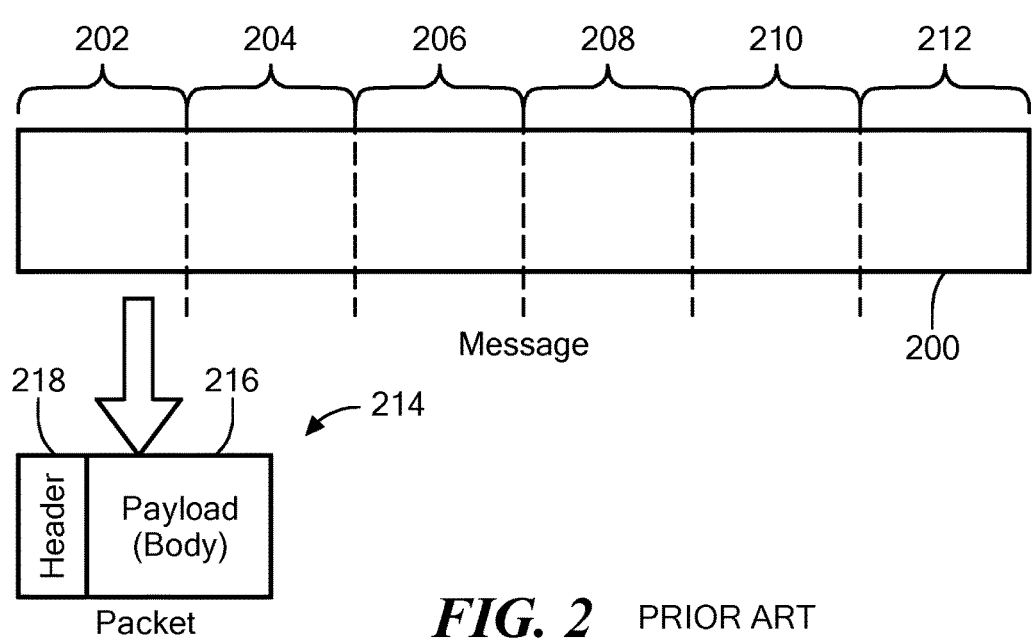
FIG. 2 schematically illustrates a prior art technique for fragmenting a message.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol fragments data into segments, officially referred to as TCP protocol data units (PDUs). Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
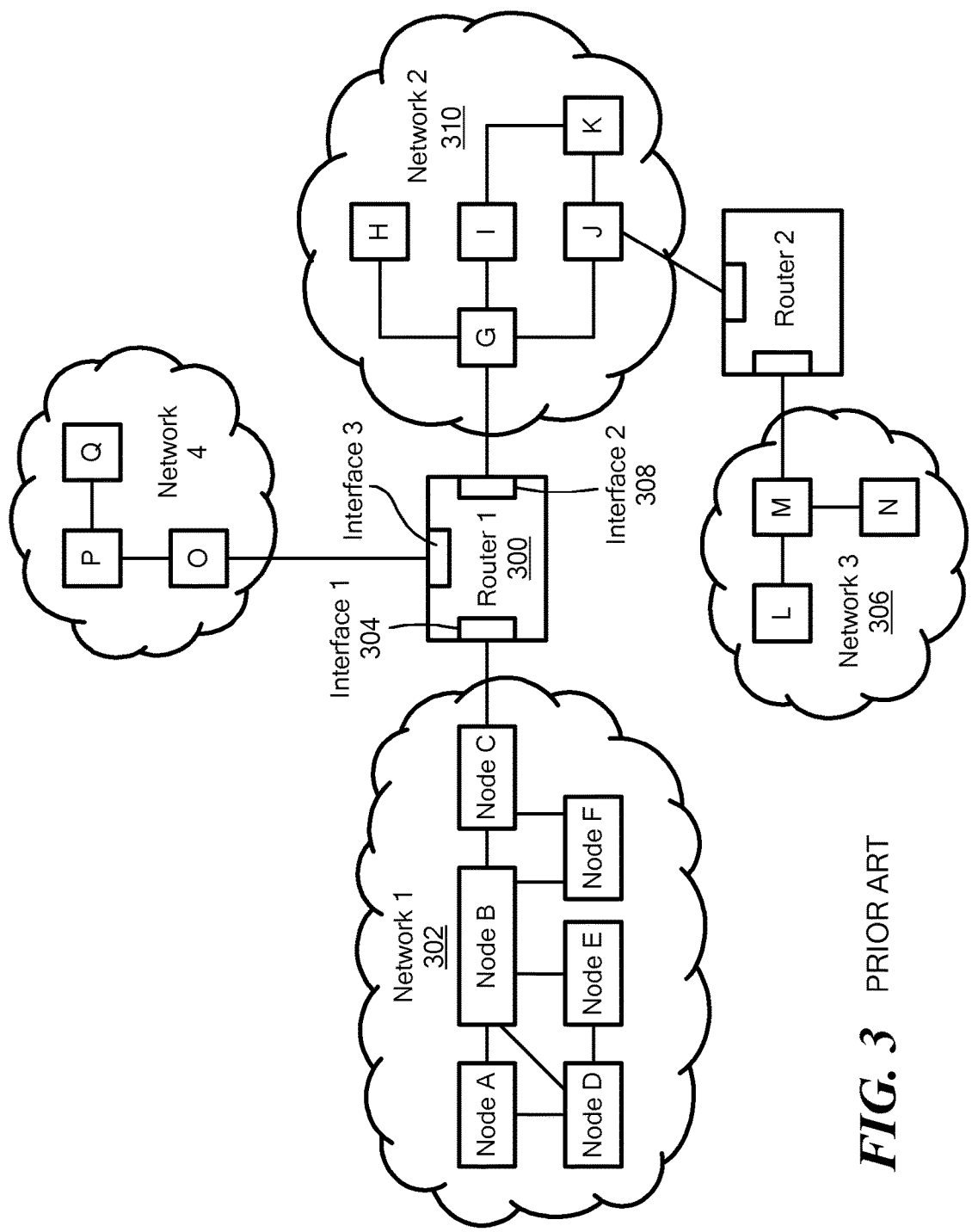
FIG. 3 schematically shows a hypothetical internet that may implement illustrative embodiments of the invention.

A router typically acts as a node that interconnects two or more distinct networks or two or more sub-networks (subnets) of a single network, thereby creating a "network of networks" (i.e., an internet). Thus, a router has at least two interfaces; i.e., one where each interface connects the router to a different network, as exemplified in FIG. 3. When a router receives a packet via one interface from one network, it uses information stored in its routing table to direct the packet to another network via another interface. The routing table thus contains network/next hop associations. These associations tell the router that a particular destination can optimally be reached by sending the packet to a specific router that represents a next hop on the way to the final destination. For example, if Router 1 (300) receives a packet, via its Interface 1 (304), from Network 1 (302), and the packet is destined to a node in Network 3 (306), the Router 1 (300) consults its router table and then forwards the packet via its Interface 2 (308) to Network 2 (310). Network 2 (310) will then forward the packet to Network 3 (306). The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain any historical information about the packet, although the forwarding action may be collected to generate statistical data if the router is so configured.

As noted, when a router receives a packet via one interface from one network, the router uses its routing table to direct the packet to another network. Table 1 lists information typically found in a basic IP routing table (stored in memory).

TABLE 1

| | |
|---|---|
| Destination | Partial IP address (Expressed as a bit-mask) or Complete IP address of a packet's final destination |
| Next hop | IP address to which the packet should be forwarded on its way to the final destination |
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer. As noted above and discussed below, however, there may be a number of possible next hop node options. Accordingly, in some embodiments, the next hop node selected for a given session can be determined based on a number of factors, such as the traffic and load on a number of potential next hop nodes.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet, or between two successive packets of a message, such as if a router becomes congested or a link fails. Two packets of a message may, therefore, in some cases, follow different paths and even arrive out of order. In other words, when a packet is sent by a source node, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

It should be noted that conventionally, packets sent by the destination node back to the source node may follow different paths than the packets from the source node to the destination node.

In many situations, as suggested above, a client computer node establishes a session with a server computer node, and the client and server exchange packets within the session. For example, a client computer executing a browser may establish a session with a web server. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes.

A session has its conventional meaning; namely, at its most basic, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services, and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term "socket" means an IP address-port number combination. Thus, each service has a network-unique, and often internet-unique, service socket, and a client making a request of a service is assigned a network-unique, and sometimes internet-unique, client socket. In places, the terms "source client" and "destination service" are used when referring to a client that sends packets to make requests of a service and the service being requested, respectively.

Encryption Control

Figure 4:
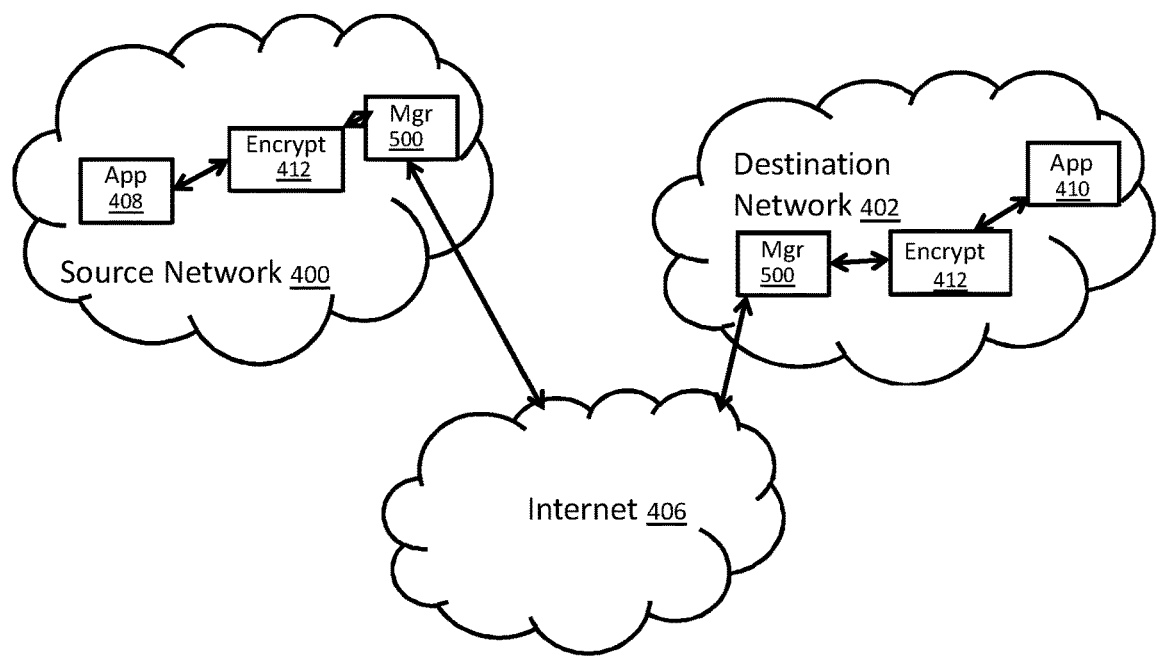
FIG. 4 schematically shows an exemplary network that may implement illustrative embodiments of the invention.

Illustrative embodiments selectively encrypt packets in a session between a source network 400 and a destination network 402. FIG. 4 thus schematically shows an exemplary network that may implement illustrative embodiments of the invention. To the extent desired, this network can operate like other network representations discussed herein, and can implement their functionality as appropriate (e.g., maintain routing state information, discussed below). As such, this network may be considered another representation (or enhanced version) of other networks, such as that shown in FIG. 1.

In particular, the network of FIG. 4 includes the noted source network 400, which communicates with the noted destination network 402 via an intervening network 406. Among other things, the source and destination networks 400 and 402 may be legal entities (e.g., separate companies), or different networks of a single legal entity (e.g., a single company). In this example, the intervening network 406 is the Internet. Of course, other embodiments may have other types of intervening networks, such as one or more local area networks or wide area networks. Alternative embodiments may have no intervening network(s) 406. Accordingly, discussion of the intervening network 406, and a specific type of intervening network are illustrative and not intended to limit various embodiments of the invention.

The source network 400 may be requesting a service from the destination network 402 to establish a new session. To that end, the source network 400 has a source application 408 that communicates with a corresponding destination application 410 on the destination via the intervening network 406. The source and destination applications 408 and 410 each may be executing on a computer device, such as a local computer system within their respective networks 400 or 402. Alternatively, one or both of the applications may be cloud computer applications that access the respective networks using a SAAS (software as a service) model. As an example of either type of application, the source and destination applications 408 and 410 may be a video conference application, such as SKYPE™. As another example, the source application 408 may be a web browser, such as Microsoft Internet Explorer™, and the destination application 410 may be a web page implemented on a server at a data center or company. With the latter example, the user may be sending a request to access data on the server or in a database local to the server hosting the web page.

To secure the connection between the source and destination networks 400 and 402, the network of FIG. 4 has security devices on each network. Specifically, the source network 400 has an encryption device, such as an edge router acting as an encryption router, that encrypts and decrypts packets respectively sent to and received by the source network 400. In a corresponding manner, the destination network 402 also has an encryption device, such as an edge router acting as an encryption router, that encrypts and decrypts packets respectively sent to and received by the destination network 402. For simplicity, both edge routers/encryption routers are identified in the figures by the same reference number "412."

There are times, however, when the application(s) themselves encrypt session packets between the source and destination networks 400 and 402. For example, many video conference applications encrypt their session data traffic to protect the confidentiality and security of the information exchanged between the source and designation networks 400 and 402. Such application encryption (i.e., Layer 7 encryption) is generally effective and important because many of these types of applications may be used on networks that do not have an encryption router 412.

Accordingly, when applications that encrypt their session packets are used on the network of FIG. 4, the encryption routers 412 encrypt already encrypted packets. The inventors discovered that this "double encryption" can degrade the quality of the session between the source and destination networks 400 and 402. For example, this extra layer of encryption can cause delay, increasing network latency, producing jitter, etc. The inventors recognized these technical problems and, consequently, improve the performance of the underlying computer and network by implementing various embodiments of the invention.

Specifically, to mitigate or eliminate these problems technical produced by the double encryption, illustrative embodiments selectively disable the encryption function of the encryption routers 412. In other words, illustrative embodiments control the encryption process of the encryption routers 412 to avoid, when possible, this double encryption problem.

To that end, each of the two networks 400 and 402 has access to an encryption manager 500 that is configured to reduce or eliminate double encryption. It should be noted that the networks 400 and 402 may share the functionality of the encryption manager 500, or have multiple encryption managers 500. Also, although FIG. 4 shows the encryption managers 500 as receiving packets before the encryption router or edge router 412, those skilled in the art may move the logical and/or physical location of the encryption manager 500 so that it is not the first to receive data traffic. As noted below, however, the encryption manager 500 should monitor and act on session traffic if necessary.

Figure 5:
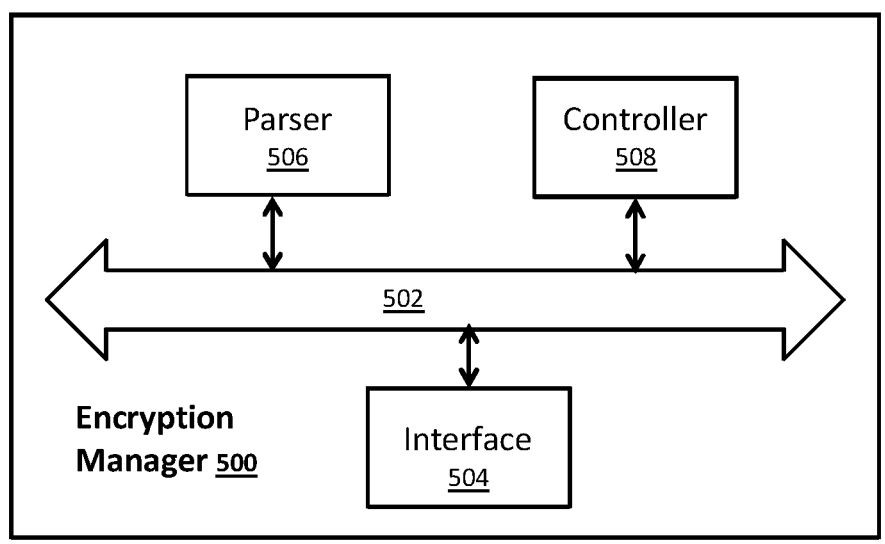
FIG. 5 schematically shows an apparatus for controlling encryption of a session in accordance with illustrative embodiments of the invention.

FIG. 5 schematically shows more details of the encryption management manager 500 of FIG. 4. Each of the components of the encryption manager 500 is operatively connected by any conventional interconnect mechanism, identified schematically by reference number 502. FIG. 5 simply schematically shows a bus 502 communicating each the components. Those skilled in the art should understand that this generalized representation can be modified to include other conventional direct or indirect connections. Accordingly, discussion of a bus 502 is not intended to limit various embodiments.

Indeed, it should be noted that FIG. 5 only schematically shows each of the discussed components. Those skilled in the art should understand that each of these components can be implemented in a variety of conventional manners, such as by using hardware, software, or a combination of hardware and software, across one or more other functional components. For example, the encryption manager 500 has a parser 506, discussed below, which may be implemented using a plurality of microprocessors executing firmware. As another example, the parser 506 may be implemented using one or more application specific integrated circuits (i.e., "ASICs") and related software, or a combination of ASICs, discrete electronic components (e.g., transistors), and microprocessors. Accordingly, the representation of the parser 506 and other components in a single box of FIG. 5 is for simplicity purposes only.

In some embodiments, the encryption manager 500 of FIG. 5 is distributed across a plurality of different machines—not necessarily within the same housing or chassis. In fact, the encryption manager 500 may be distributed across both the source and destination networks 400 and 402, or distributed about one of the source and destination networks 400 and 402. Moreover, the encryption manager 500 may be part of a larger device, such as part of a router (e.g., one or both of the encryption routers 412).

It should be reiterated that the representation of FIG. 5 is a significantly simplified representation of the encryption manager 500. Those skilled in the art should understand that, depending on its implementation, such a device may have many other physical and functional components, such as central processing units, other packet processing modules, and short-term memory. Accordingly, this discussion is in no way intended to suggest that FIG. 5 represents all of the elements of the encryption manager 500.

In the example discussed below with regard to the process of FIG. 6, each network has a local encryption manager 500 that cooperates with its local encryption router 412 to control encryption. In that case, the local encryption manager 500 may be implemented separately from its local encryption router 412, or may be implemented within its local encryption router 412. The encryption manager 500 thus has an interface 504 for communicating with other devices, such as its local encryption router 412 or components within its relevant encryption router 412. For example, when implemented as a stand-alone element (e.g., as a hardware device, or as a virtual device within a computer system or router), the interface 504 may communicate with its local encryption router 412 via the interface 504. Some embodiments of the interface 504 may communicate with other devices, such as a configuration utility, other computer systems, and/or other networks (e.g., the encryption manager 500 on the other network). Importantly, the interface 504 is configured to receive packets for sessions the encryption manager 500 monitors.

The encryption manager 500 also includes the prior noted parser 506, which receives session packets from the interface 504, and parses those session packets to determine if they already are encrypted (e.g., by a Layer 7/Application Layer entity). A controller 508, which is operatively coupled with the parser 506, then controls the encryption router 412 to permit communication of the session without further encrypting the session packets. In some embodiments, rather than as separate units, the functionality of the parser 506 and controller 508 may be integrated as a single unit.

As discussed below with regard to FIG. 6, the controller 508 preferably prevents the encryption router 412 from double encrypting all session packets. In other embodiments, however, some of the session packets may be encrypted. This latter case still should be a technical improvement over prior art double encryption processes since the encryption router 412 does not double encrypt all of the session packets.

Figure 6:
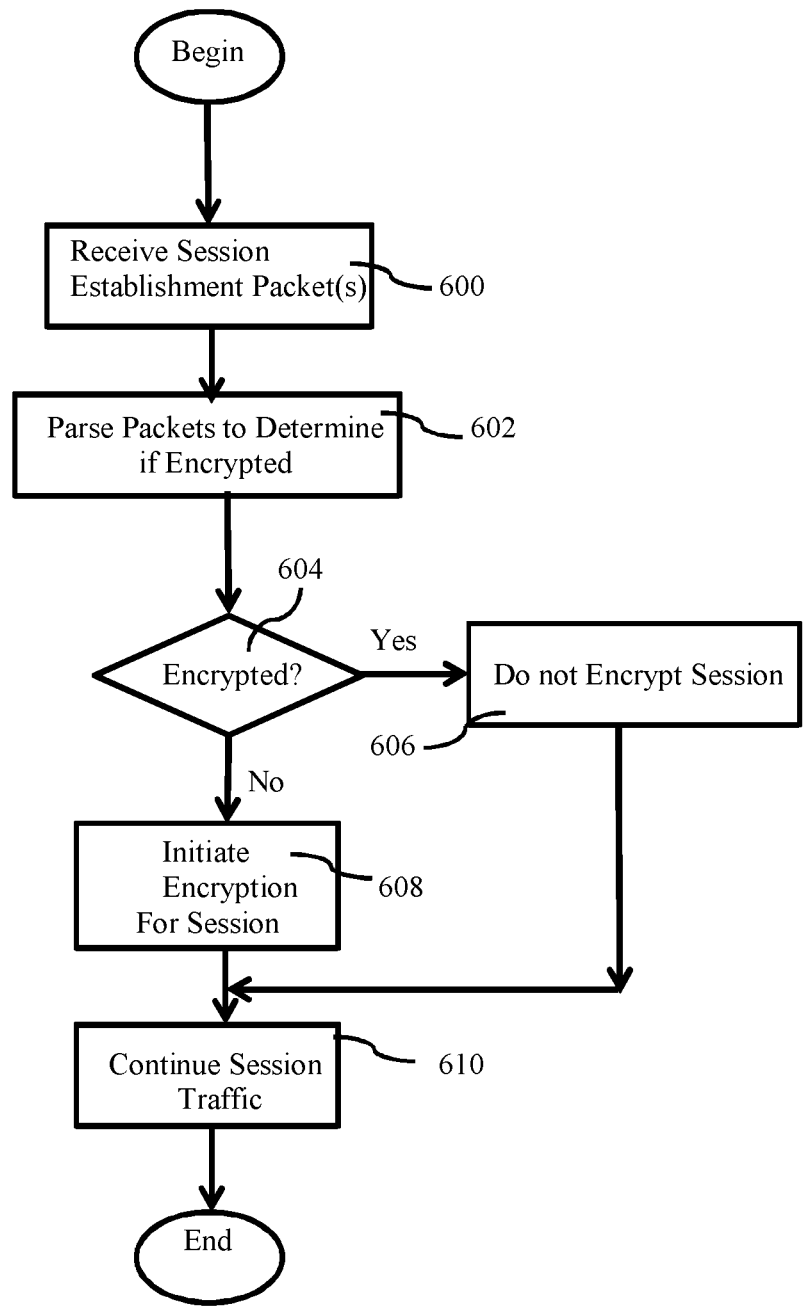
FIG. 6 shows a process of controlling encryption of a session in accordance with illustrative embodiments of the invention.

FIG. 6 shows a process used by the encryption manager 500 to mitigate or eliminate the technical problems associated with double encryption. It should be noted that this process is substantially simplified from a longer process that may be used to control inter-network encryption—it is just a portion of the overall process. Accordingly, the process may have many other steps, such as further handshake steps and authentication steps, which those skilled in the art may use. In addition, some of the steps may be performed in a different order than that shown, or at the same time. Those skilled in the art therefore can modify the process as appropriate. Moreover, as noted above and below, many of the specific techniques noted are examples of a wide variety of different techniques that may be used. Those skilled in the art can select the appropriate techniques depending upon the application and other constraints. Accordingly, discussion of specific techniques is not intended to limit all embodiments.

The process begins at step 600, which receives the packets that establish the session. To start this step, the source network 400 may send one or more packets to the destination network 402 to establish a session. The encryption managers 500 on both networks thus monitor the packet flow between the two networks to complete this step. If the networks communicate using the TCP protocol with the TLS encryption protocol, the encryption manager 500 on the destination network 402 receives an initial SYN packet from the source network 400 (i.e., from the application on the source network 400). The destination network 402 (i.e., the application on the destination network 402) then replies by sending the well-known ACK packet to the source network 400. The source network 400 then replies to the ACK packet by sending the SYN ACK packet back to the destination network 402.

This step continues when the source network 400 forwards an encrypted packet toward the destination network 402. The parser 506 (of the source network 400) operates in parallel by parsing the session initiation traffic, including the SYN, ACK, and SYN ACK packets above, and other packets in the session (step 602). Specifically, with the TLS protocol, this initial encrypted packet is known as the "Hello Packet," which is sent by the source network 400 and initiates the well-known "TLS handshake" after the TCP connection is established. As noted, like that of the destination network 402, the encryption manager 500 of the source network 400 monitors this session traffic within its network. To that end, the parser 506 of the source network 400 parses this session traffic. Thus, at step 604, the parser 506 recognizes that the Hello Packet is, in fact, encrypted (or a prelude to other encrypted packets) in this example using the TLS encryption protocol.

In alternative embodiments, the parser 506 of the source network 400 may not be the first to parse the Hello Packet— it just forwards the Hello Packet to the destination network 402. In that case, the source network 400 may forward the Hello Packet to the destination network 402, and the parser 506 of the destination network 402 may parse and recognize the Hello Packet. The encryption manager 400 of the source network 400, in that alternative embodiment, then may first recognize encrypted session traffic on the return packets.

Based on current TLS specifications, the parser 506 may examine data after the TCP packet header to determine if the packet is encrypted (or about to be encrypted). The respective TLS patterns are as follows for the following versions of TLS:

TLS 1.0: "0×16 03 01"
TLS 1.1: "0×16 03 02"
TLS 1.2: "0×16 03 03"

Figure 24:
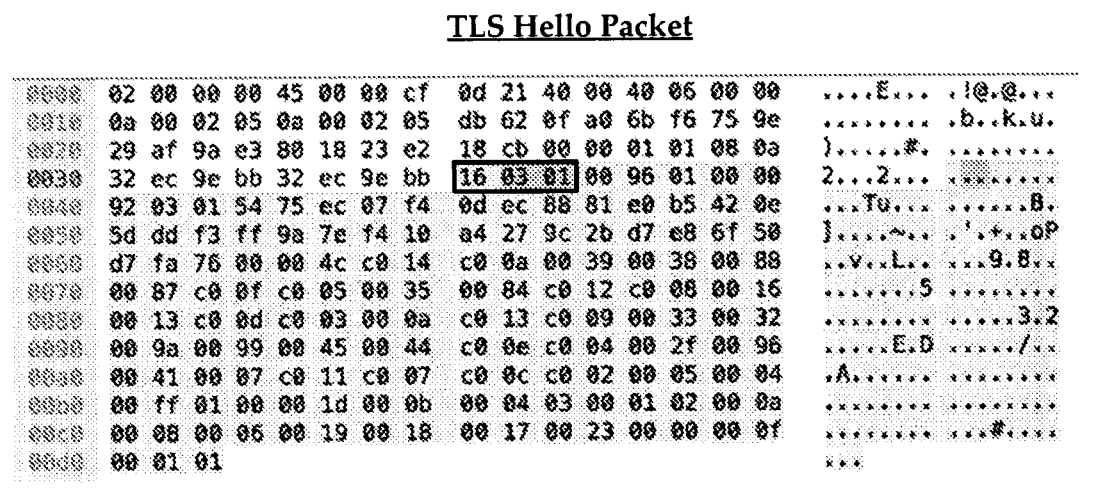

FIG. 24 illustrates an example of a TLS Hello Packet using the pattern of TLS 1.0. As shown, the first three bytes after the TCP header read: "16 03 01," where 16 indicates that this is a TLS handshake packet, and "03 01" indicates that it is a TLS version 1.0 Hello Packet. For simplicity, the relevant bytes of the packet in FIG. 24 have a box around them.

The parser 506 preferably is configured to check the session packets for any of a variety of different encryption protocols—not just the TLS protocol. That way, the encryption manager 500 can broadly monitor for a variety of different types of encrypted packets to reduce the likelihood that the session will have the double encryption problem. For example, in addition to being configured to detect the TLS encryption, the parser 506 may be configured to also detect IPSec. In that case, the parser 506 is configured to read the headers in the packets to determine if it is encrypted using IPSec. As known by those in the art, IP Protocol Number 50 (for ESP) and IP Protocol Number 51 (for AH) in the IP packet header indicate that the packet is encrypted using the IPSec encryption protocol.

If the parser 506, in the source network 400, determines at step 604 that the received packet is encrypted (i.e., in this example, the received packet is the Hello Packet), then the process continues to step 606, in which the controller 508 permits further session communication without further encrypting the session packets. In other words, when the controller 508 receives an indication from the parser 506 that the packet is encrypted (by the application), the controller 508 controls its encryption router 412 so that it does not encrypt packets in this session between the source and destination networks 400 and 402. This may require an affirmative action (e.g., an override of default encryption processes of the encryption router 412), or a passive action (e.g. if the encryption router 412 does not default to encrypt this session). In either case, the controller 508 may disable or override the normal encryption functionality of the encryption router 412 for this session.

This step continues when, as noted above, the source network 400 forwards the Hello Packet to the destination network 402. Thus, after it receives the Hello Packet, the destination network parser 506 also will determine that the session packets are encrypted. In response, the controller 508 on that same encryption manager 500 will control its local encryption router 412 to mitigate or otherwise disable the encryption functionality. At this point, the source and destination networks 400 and 402 may continue communicating in this session without the double encryption problem, improving the quality of the session (compared to known prior art encryption practices).

Returning to step 604, if the relevant parser 506 determines that the received packet is not encrypted, then the process continues to step 608, in which the controller 508 permits its encryption router 412 to operate without interfering. In other words, the controller 508 does not forward commands, via the interface 504, to the encryption router 412 disabling its normal encryption processes (or perform some other action disabling normal encryption). In this example, the source network encryption manager 400 will determine that the received packet is not encrypted. In response, that encryption manager 400 will not interfere with the encryption router functionality. For example, the encryption router 412 may be configured to encrypt all traffic, or selected traffic, and those settings will remain unchanged. The encryption manager 500 does not interfere with that normal process. The destination network encryption manager 400 similarly will have the same response when it receives the relevant packet(s). Thus, in this case, encryption continues between the two networks with its original encryption configuration.

The process concludes at step 610 by continuing session communication as determined by this process.

Stateful Routing

In certain exemplary embodiments, at least some of the routers in the communication system are specially configured to perform "stateful" routing on packets associated with a given session between a source node/network and destination node/network, as discussed herein. For convenience, such routers are referred to above and below as Augmented IP Routers (AIPRs) or waypoint routers. AIPRs and stateful routing also are discussed in related incorporated patent applications, which are incorporated by reference above. For convenience, packets being routed from the source node toward the destination node may be referred to herein as "forward" packets or the "forward" direction or path, and packets being routed from the destination node toward the source node may be referred to herein as "reverse" packets or the "reverse" direction or path.

Generally speaking, stateful routing is a way to ensure that subsequent packets of a session follow the same path as the lead packet of the session through a particular set of AIPRs in the forward and/or reverse direction. The lead packet of the session may pass through one or more AIPRs, either due to traditional routing, or by having each successive AIPR through which the lead packet passes expressly select a next hop AIPR if possible.

The AIPRs through which the lead packet passes insert special metadata into the lead packet and optionally also into return packets as needed to allow each AIPR on the path to determine whether there is a prior node or AIPR on the path and whether there is a next hop node or AIPR on the path. To force session packets to traverse the same set of AIPRs, each successive AIPR typically changes the destination address field in each session packet to be the address of the next hop AIPR, and changes the source address field in each session packet to be its own network address. The last AIPR prior to the destination node then will change the source and destination address fields back to the original source and destination addresses used by the source node. In this way, session packets can be forwarded, hop by hop, from the source node through the set of AIPRs to the destination node, and vice versa.

It should be noted that discussion of an AIPR is but one embodiment. Other embodiments may perform the process of FIG. 5 using routers without all the described functionality of an AIPR.

Figure 7:
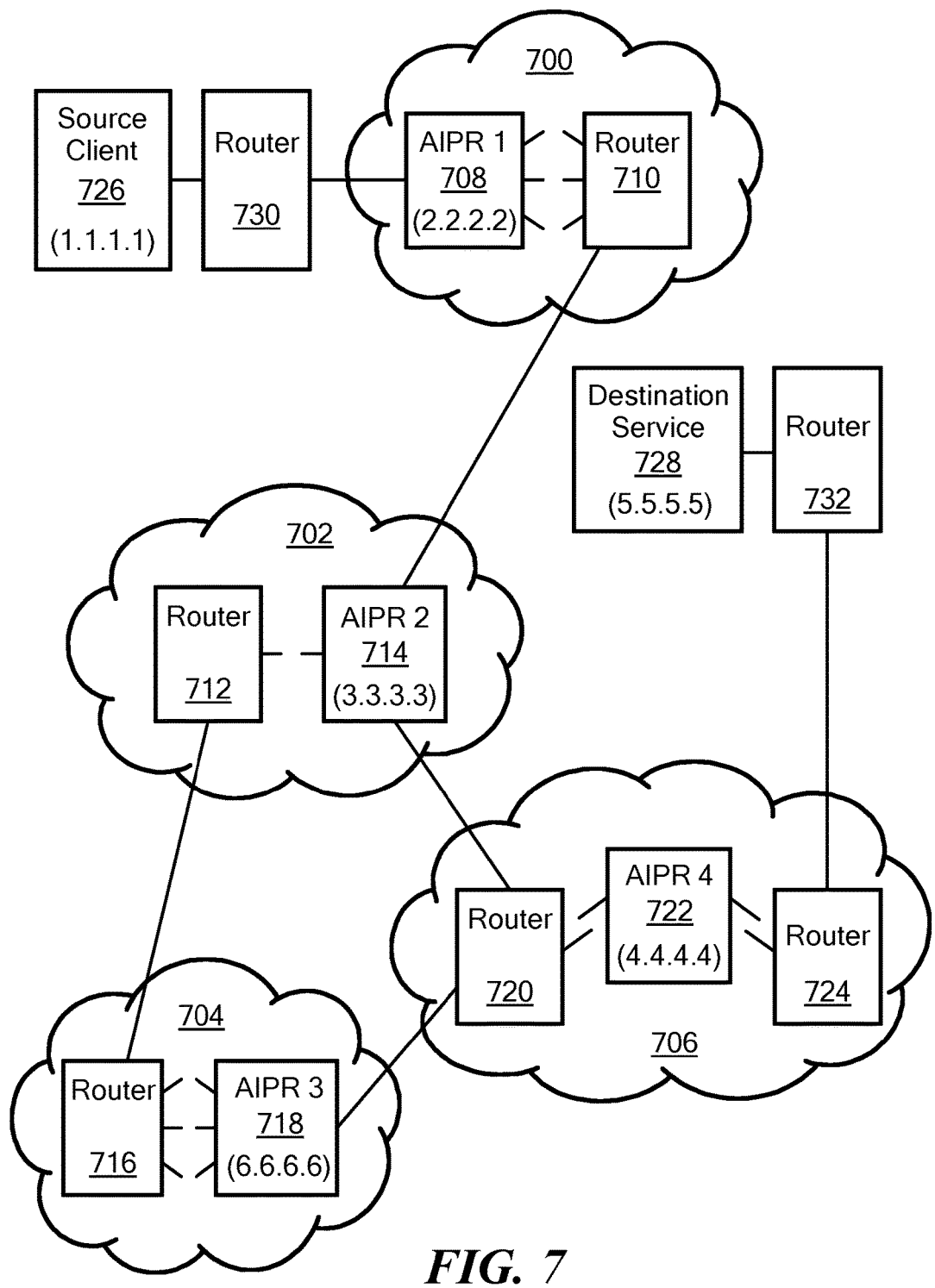
FIG. 7 schematically shows a hypothetical internet that includes conventional routers and augmented IP routers (AIPRs), in accordance with one exemplary embodiment.

Certain aspects of one exemplary stateful routing embodiment are now described with reference to FIGS. 7-15. FIG. 7 schematically shows a hypothetical internet that includes conventional routers and AIPRs, according to one exemplary embodiment of the present invention. Among other things, FIG. 7 illustrates a hypothetical set of interconnected networks 700, 702, 704 and 706, i.e., an internet. Each network 700-706 includes a number of routers and AIPRs, not all of which are necessarily shown. Network 700 includes AIPR 1 708 and router 710. Network 700 may be, for example, a network of a telecommunications carrier. Network 702 includes a router 712 and AIPR 2 714. Network 702 may be, for example, a network of a first ISP. Network 704 includes a router 716 and AIPR 3 718. Network 704 may be, for example, the Internet backbone or a portion thereof. Network 706 includes a router 720, AIPR 4 722 and another router 724. Network 706 may be, for example, a network of a second ISP. For the sake of this discussion, the source client node 726 is associated with fictitious network address 1.1.1.1; AIPR 1 708 is associated with fictitious network address 2.2.2.2; AIPR 2 714 is associated with fictitious network address 3.3.3.3; APIR 3 718 is associated with fictitious network address 6.6.6.6; AIPR 4 722 is associated with fictitious network address 4.4.4.4; and destination service node 728 is associated with fictitious network address 5.5.5.5. It should be noted that embodiments of the present invention is not limited to the network shown in FIG. 7 or to any particular network.

Figure 8:
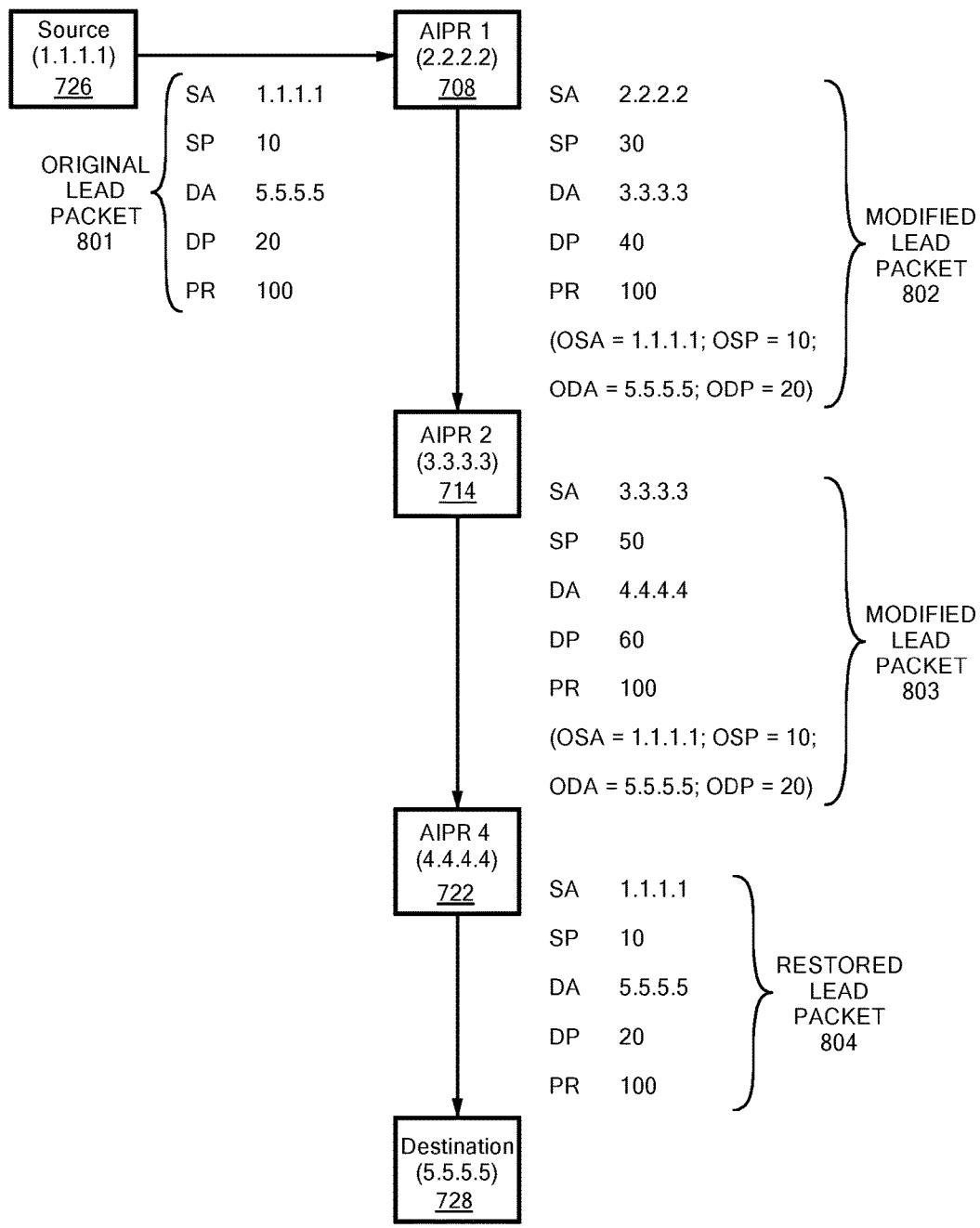
FIG. 8 schematically shows an example of lead packet processing from a source node to a destination node for stateful routing, in accordance with one exemplary embodiment.
Figure 12:
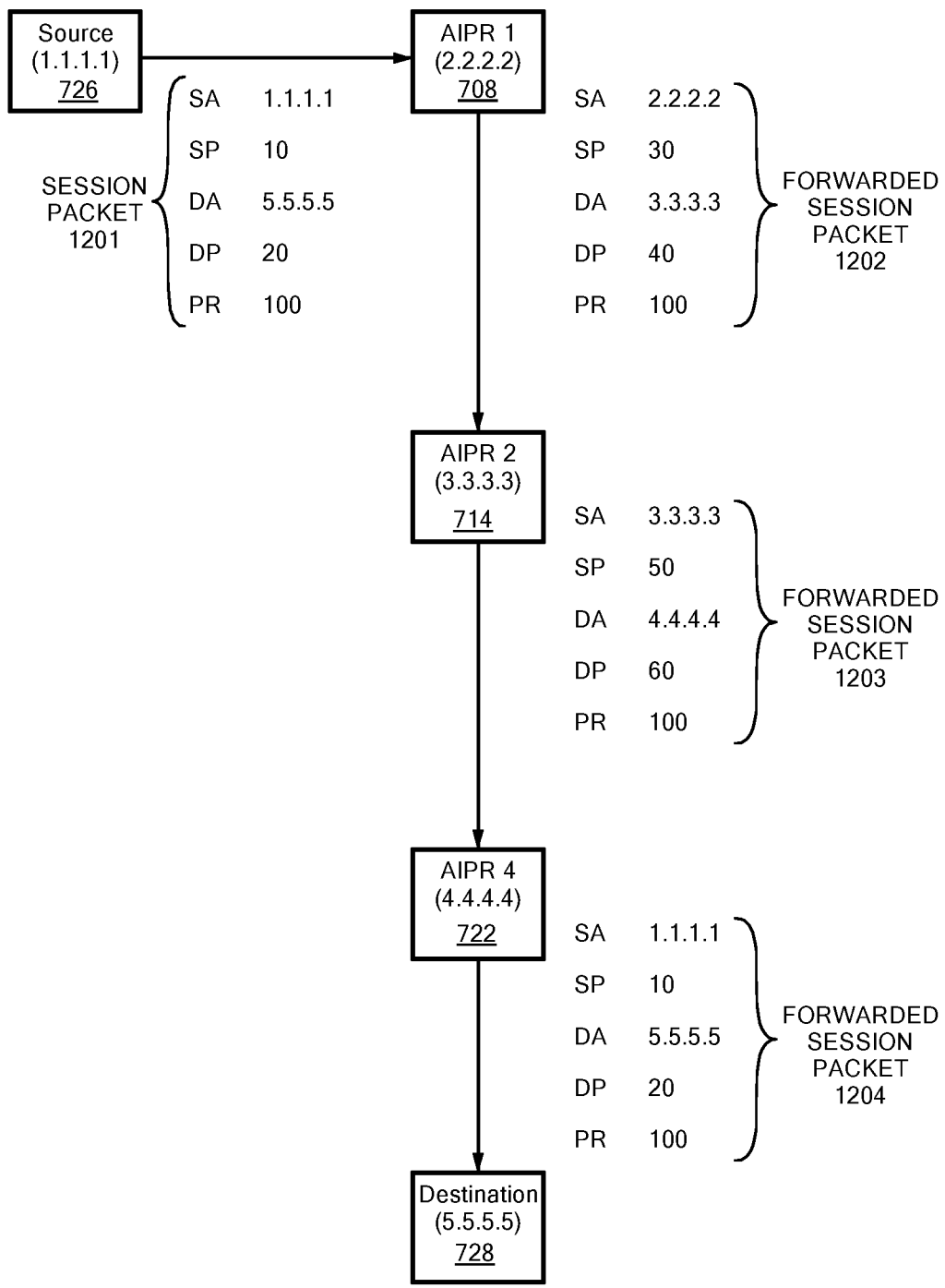
FIG. 12 is a schematic diagram providing an example of session packet processing for an example packet sent from the source device to the destination device through the AIPR devices for the session established in FIG. 8, in accordance with one exemplary embodiment.
Figure 13:
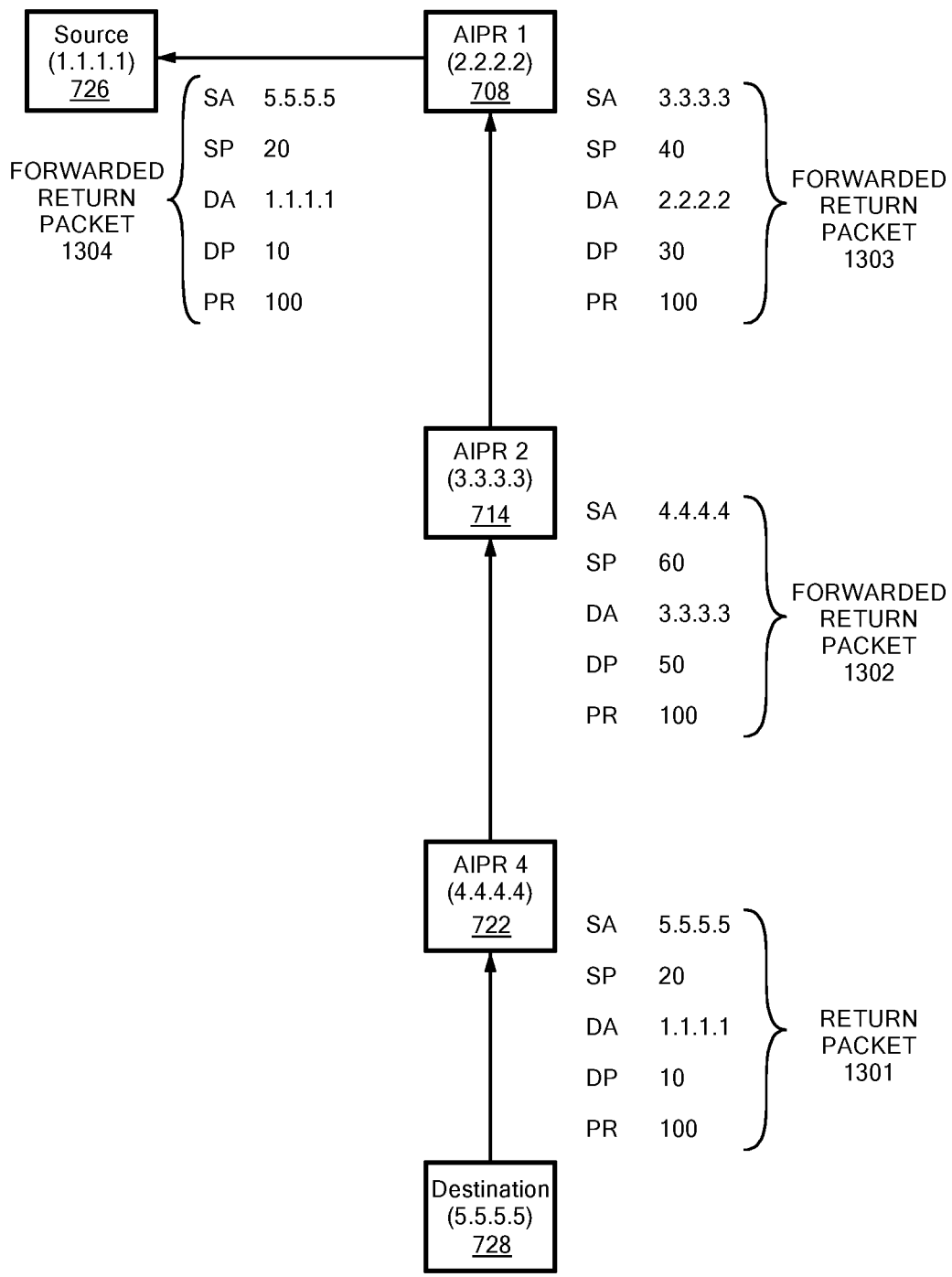
FIG. 13 is a schematic diagram providing an example of session packet processing for a return packet sent by the destination device to the source device through the AIPR devices for the session established in FIG. 8, in accordance with one exemplary embodiment.

FIG. 8 schematically shows an example of lead packet processing from a source node to a destination node for stateful routing, in accordance with illustrative embodiments of the invention. FIG. 9 is a schematic diagram showing session-related data associated with AIPR 1 708 based on the lead packet processing of FIG. 8. FIG. 10 is a schematic diagram showing session-related data associated with AIPR 2 714 based on the lead packet processing of FIG. 8. FIG. 11 is a schematic diagram showing session-related data associated with AIPR 4 722 based on the lead packet processing of FIG. 8. FIG. 12 is a schematic diagram providing an example of session packet processing for an example packet sent from the source device to the destination device through the AIPR devices for the session established in FIG. 8. FIG. 13 is a schematic diagram providing an example of session packet processing for a return packet sent by the destination device to the source device through the AIPR devices for the session established in FIG. 8.

In this example, each AIPR is presumed to have a priori knowledge of the other AIPRs in the network in relation to the network/next hop associations contained in its routing information base, such that, for example, a particular AIPR knows not only the outgoing port for a particular destination network address, but also the next waypoint AIPR (if any) to use for that destination network address.

As noted above, in stateful routing, all forward packets associated with a particular session are made to follow the same path through a given set of AIPRs on their way from the source client node 726 to the destination service node 728. In a similar manner, all return packets associated with the session typically, but not necessarily, are made to traverse the same set of AIPRs in reverse order on their way from the destination service node 728 to the source client node 726.

Assume the source client node 726 initiates a session with the destination service node 728. For example, the source client node 726 may request a web page, and the destination service node 728 may include a web server. The source client node 726 may, for example, be part of a first local area network (LAN) (not shown) within a first corporation, and the LAN may be connected to the telecommunications carrier network 700 via a gateway router 730 operated by the corporation. Similarly, the destination service node 728 may be operated by a second corporation, and it may be part of a second LAN (not shown) coupled to the network 706 of the second ISP via a gateway router 732 operated by the second corporation.

To establish a communication session between the source client node 726 and the destination service node 728, the source client node 726 typically transmits a lead packet for the session, which generally initiates a communication exchange between the source client node 726 and the destination service node 728. This allows subsequent session-related packets to be exchanged by the two nodes. The type of lead packet will depend on the protocol(s) being used by the source and destination nodes. For the example used herein, TCP/IP-based communications are assumed, in which case the lead packet may include a TCP SYN message carried in an IP datagram. This lead packet typically will include a source address equal to the IP address of the source client node 726 (i.e., 1.1.1.1), a destination address equal to the IP address of the destination service node 728 (i.e., 5.5.5.5), and various types of Transport Layer information including a source port number, a destination port number, and a protocol identifier. For convenience, the combination of source address, source port number, destination address, destination port number, and protocol identifier in a packet is referred to hereinafter collectively as a "5-tuple" and is used in various exemplary embodiments as a session identifier for "stateful" routing, as discussed below.

FIG. 8 shows an exemplary lead packet 801 transmitted by the source client node 726. In this example, the lead packet 801 includes a source address (SA) of 1.1.1.1; a source port number (SP) of 10; a destination address (DA) of 5.5.5.5; a destination port number (DP) of 20; and a protocol identifier (PR) of 100.

The lead packet 801 may be routed naturally and therefore, depending on various factors, the lead packet may or may not reach an AIPR on its way from the source node to the destination node. Thus, waypoints are not necessarily predetermined before the lead packet is transmitted by the source node. However, in some exemplary embodiments, a particular AIPR (e.g., AIPR 1 708 in FIG. 7) may be configured as the default router/gateway for the source node, in which case the lead packet is virtually assured to reach an AIPR.

Assume the lead packet 801 reaches AIPR 1 708 before it reaches network 702, 704 or 706. AIPR 1 708 automatically identifies the lead packet as being an initial packet of a new session (in this example, referred to as "Session X"). AIPR 1 708 may use various techniques to identify the beginning of a session, as discussed in more detail below. For example AIPR 1 708 may identify the beginning of the session based on the 5-tuple of information in the lead packet. AIPR 1 708 also determines that the lead packet 801 is not a modified lead packet containing session metadata. Therefore, AIPR 1 708 determines that it is the first waypoint AIPR for Session X and stores an indicator so that it will process subsequent packets associated with the session as the first waypoint AIPR. This is represented in FIG. 9 as "Flag=First Waypoint AIPR."

AIPR 1 708 stores 5-tuple information from the received lead packet 801 as the Return Association (RA) for Session X. This is represented in FIG. 9 as "Return Association" information. For convenience, the source address, source port number, destination address, destination port number, and protocol identifier information associated with a particular session is referred to in FIGS. 9-11 as session source address (SSA), session source port number (SSP), session destination address (SDA), session destination port number (SDP), and session protocol identifier (SPR), respectively.

To forward a modified lead packet (i.e., Modified Lead Packet 802) over an outgoing interface, AIPR 1 708 accesses its routing information base to look up routing information based on the original destination address of 5.5.5.5 (e.g., outgoing interface and next node information). In this example, AIPR 1 708 identifies AIPR 2 714 as the next waypoint AIPR based on the original destination address of 5.5.5.5. In certain exemplary embodiments, AIPR 1 708 then assigns a source port number and a destination port number for outgoing packets associated with the session to permit more than 65,535 sessions to be supported concurrently (in this example, source port number 30 and destination port number 40) and stores the resulting 5-tuple as the Forward Association (FA) for outgoing packets associated with the session. This is shown in FIG. 9 as "Forward Association" information. Implicitly, the network address of AIPR 1 708 (i.e., 2.2.2.2) will be the source address for session-related packets forwarded over an outgoing interface.

Illustrative embodiments may identify the next AIPR in any of a variety of manners. For example, the AIPR may have a local session balancer that identifies a plurality of next nodes (i.e., potential next hop node), which may include all AIPRs, both AIPRs and routers, or in some cases just routers without AIPR functionality. The session balancer then may select the next hop node, whether it is an AIPR or a router without AIPR functionality (preferably leading to an AIPR though), in a way to balance packet flow.

To force the lead packet to reach next waypoint AIPR 2 714 (as opposed to being randomly routed by the routers in the network), AIPR 1 708 modifies the destination address in the lead packet to the IP address of AIPR 2 714 (i.e., 3.3.3.3). In this example, AIPR 1 708 also modifies the source address in the lead packet to its own IP address (i.e., 2.2.2.2) so that AIPR 2 714 can route return packets back to AIPR 1 708. Also in this example, AIPR 1 708 modifies the source port and destination port fields to the assigned values.

Importantly, AIPR 1 708 also modifies the lead packet to include a section of metadata including the original source address, destination address, source port, destination port, and protocol identifier from the original lead packet 801. As discussed below, this metadata is propagated to each successive AIPR on the path to allow each AIPR to maintain session information and also to allow the final AIPR on the path to restore the lead packet to its original form. AIPR 1 708 establishes and maintains various session parameters so that it can identify subsequent session packets and forward such session packets to AIPR 2 714 for stateful routing. AIPR 1 708 then transmits the modified lead packet 802 into the network toward AIPR 2 714 via the selected outgoing interface. In certain exemplary embodiments, AIPR 1 708 may establish a flow that associates the session with the incoming interface over which the lead packet 801 was received and the outgoing interface over which the modified lead packet 802 is forwarded.

FIG. 8 shows an exemplary modified lead packet 802 transmitted by AIPR 1 708. The modified lead packet 802 includes the network address of AIPR 1 708 (i.e., 2.2.2.2) as the source address (SA), the assigned session source port number (SSP) of 30 as the source port number (SP), the network address of AIPR 2 714 (i.e., 3.3.3.3) as the destination address (DA), the assigned session destination port number (SDP) of 40 as the destination port number (DP), and the received protocol identifier of 100 as the protocol identifier (PR). AIPR 1 708 also includes the original source address (OSA) of 1.1.1.1, the original source port number (OSP) of 10, the original destination address (ODA) of 5.5.5.5, and the original destination port number (ODP) of 20 from the original lead packet 801 as metadata in the modified lead packet 802. This information is shown in parentheses to represent that it is metadata that has been added to the lead packet.

In this example, AIPR 1 708 forwards the modified lead packet 802 to AIPR 2 714 via router 710. The modified lead packet 802 packet may traverse other routers between AIPR 1 708 and AIPR 2 714. Because the destination address in the modified lead packet 802 is set to the IP address of AIPR 2 714 (i.e., 3.3.3.3), the modified lead packet should eventually reach AIPR 2 714. P AIPR 2 714 automatically identifies the modified lead packet 802 as being an initial packet of the session, but also identifies that AIPR 2 714 is not the first waypoint for the session because the modified lead packet already contains metadata inserted by AIPR 1 708. AIPR 2 714 therefore becomes the second waypoint along the path the lead packet eventually follows.

AIPR 2 714 stores 5-tuple information from the received modified lead packet 802 as the Return Association (RA) for Session X. This is represented in FIG. 10 as "Return Association" information.

To forward a modified lead packet (i.e., Modified Lead Packet 803) over an outgoing interface, AIPR 2 714 accesses its routing information base to look up routing information based on the original destination address of 5.5.5.5 (e.g., outgoing interface and next node information). In this example, AIPR 2 714 identifies two possible next hop AIPRs for the lead packet to reach destination service node 728, namely AIPR 3 718 and AIPR 4 722. Assume AIPR 2 714 selects AIPR 4 722 as the next hop AIPR for the path (e.g., using the process of FIG. 5). AIPR 2 714 therefore determines that it is an intermediate waypoint AIPR for the session, i.e., it is neither the first waypoint AIPR nor the last waypoint AIPR. AIPR 2 714 stores an indicator so that it will process subsequent packets associated with the session as an intermediate waypoint AIPR. This is represented in FIG. 10 as "Flag=Intermediate Waypoint AIPR." In this example, AIPR 2 714 then assigns a source port number and a destination port number for outgoing packets associated with the session (in this example, source port number 50 and destination port number 60) and stores the resulting 5-tuple as the Forward Association (FA) for outgoing packets associated with the session. This is shown in FIG. 10 as "Forward Association" information. Implicitly, the network address of AIPR 2 714 (i.e., 3.3.3.3) will be the source address for session-related packets forwarded over an outgoing interface.

To force the modified lead packet 803 to reach AIPR 4 722 (as opposed to being randomly routed by the routers in the network), AIPR 2 714 modifies the destination address in the lead packet to the IP address of AIPR 4 722 (i.e., 4.4.4.4). In this example, AIPR 2 714 also modifies the source address in the lead packet to its own IP address (i.e., 3.3.3.3) so that AIPR 4 722 can route return packets back to AIPR 2 714. Also in this example, AIPR 2 714 modifies the source port and destination port fields to the assigned values. Importantly, AIPR 2 714 leaves the section of metadata including the original source address, destination address, source port, destination port, and protocol identifier. AIPR 2 714 establishes and maintains various session parameters so that it can identify subsequent session packets and forward such session packets to AIPR 4 722 for stateful routing. AIPR 2 714 then transmits the modified lead packet 803 into the network toward AIPR 4 722 via the selected outgoing interface. In certain exemplary embodiments, AIPR 2 714 may establish a flow that associates the session with the incoming interface over which the modified lead packet 802 was received and the outgoing interface over which the modified lead packet 803 is forwarded.

FIG. 8 shows an exemplary modified lead packet 803 transmitted by AIPR 2 714. The modified lead packet 803 includes the network address of AIPR 2 714 (i.e., 3.3.3.3) as the source address (SA), the assigned session source port number (SSP) of 50 as the source port number (SP), the network address of AIPR 4 722 (i.e., 4.4.4.4) as the destination address (DA), the assigned session destination port number (SDP) of 60 as the destination port number (DP), and the received protocol identifier of 100 as the protocol identifier (PR). AIPR 2 714 also includes the original source address (OSA) of 1.1.1.1, the original source port number (OSP) of 10, the original destination address (ODA) of 5.5.5.5, and the original destination port number (ODP) of 20 from the modified lead packet 802 as metadata in the modified lead packet 803. This information is shown in parentheses to represent that it is metadata that has been added to the lead packet.

In this example, AIPR 2 714 forwards the modified lead packet 803 to AIPR 4 722 via router 720. The modified lead packet 803 may traverse other routers between AIPR 2 714 and AIPR 4 722. Because the destination address in the modified lead packet 803 is set to the IP address of AIPR 4 722 (i.e., 4.4.4.4), the modified lead packet should eventually reach AIPR 4 722.

AIPR 4 722 automatically identifies the modified lead packet as being an initial packet of the session, but also identifies that AIPR 4 722 is not the first waypoint for the session because the modified lead packet already contains metadata inserted by AIPR 2 714. AIPR 4 722 therefore becomes the third waypoint along the path the lead packet eventually follows.

AIPR 4 722 stores 5-tuple information from the received modified lead packet 803 as the Return Association (RA) for Session X. This is represented in FIG. 11 as "Return Association" information.

To forward a modified lead packet over an outgoing interface, AIPR 4 722 accesses its routing information base to look up routing information based on the original destination address of 5.5.5.5 (e.g., outgoing interface and next node information). AIPR 4 722 determines that there is no next hop AIPR for the lead packet to reach destination service node 728. AIPR 4 722 therefore determines that it is the last waypoint AIPR on the path. AIPR 4 722 stores an indicator so that it will process subsequent packets associated with the session as a final waypoint AIPR. This is represented in FIG. 11 as "Flag=Final Waypoint AIPR." AIPR 4 722 then stores the original 5-tuple information as the Forward Association (FA) for outgoing packets associated with the session. This is shown in FIG. 11 as "Forward Association" information.

As the last waypoint AIPR, AIPR 4 722 performs special processing on the lead packet. Specifically, AIPR 4 722 removes the metadata section from the lead packet and restores the source address, destination address, source port, destination port, and protocol identifier fields in the lead packet back to the original values transmitted by source client node 726, which it obtains from the metadata in modified lead packet 803. AIPR 4 722 establishes and maintains various session parameters so that it can identify subsequent session packets and forward such session packets to destination service node 728 for stateful routing. AIPR 4 722 then transmits the restored lead packet 804 into the network toward destination service node 728 via the selected outgoing interface. In certain exemplary embodiments, AIPR 4 722 may establish a flow that associates the session with the incoming interface over which the lead packet 803 was received and the outgoing interface over which the restored lead packet 804 is forwarded.

FIG. 8 shows an exemplary restored lead packet 804 transmitted by AIPR 4 722. The restored lead packet 804 includes the original source address of 1.1.1.1 as the source address (SA), the original source port number (SSP) of 10 as the source port number (SP), the original destination device address of 5.5.5.5 as the destination address (DA), the original destination port number of 20 as the destination port number (DP), and the received/original protocol identifier of 100 as the protocol identifier (PR).

In this example, AIPR 4 722 forwards the restored lead packet 804 to destination service node 728 via routers 724 and 732. The restored lead packet 804 may traverse other routers between AIPR 4 722 and destination service node 728. Because the destination address in the restored lead packet 804 is set to the IP address of destination service node 728 (i.e., 5.5.5.5), the restored lead packet should eventually reach destination service node 728.

Thus, as a lead packet of the session traverses the internet when the session is established, each AIPR (waypoint) that the packet traverses records information that eventually enables the waypoint to be able to identify its immediately previous waypoint and its immediately next waypoint, with respect to the session.

It should be noted that AIPRs may establish stateful sessions in a number of ways and accordingly may determine the next hop node using a variety of techniques (e.g., natural routing or a round robin technique).

Each node can store information for multiple sessions. For example, FIGS. 9-11 schematically show information stored for additional Sessions Y and Z. As for Session X, the information stored for Sessions Y and Z includes Return Association (RA) information, Forward Association (FA) information, and a Flag. It should be noted that the AIPRs may have different roles in different sessions, e.g., whereas AIPR 1 708 is the first waypoint AIPR and AIPR 4 722 is the final waypoint AIPR in the example of FIG. 8, AIPR 1 708 could be the final waypoint AIPR for Session Y and could be an intermediate waypoint AIPR for Session Z.

After the lead packet has been processed and the session-related information has been established by the waypoint AIPRs hop-by-hop from the source client node 726 to the destination service node 728, additional session packets may be exchanged between the source client node 726. Accordingly, the destination service node 728 may establish an end-to-end communication session between the source client node 726 and the destination service node 728 in this manner.

FIG. 12 is a schematic diagram providing an example of session packet processing for an example session packet sent from the source client node 726 to the destination service node 728 through the AIPR devices for the session established in FIG. 8. Here, the source client node 726 sends a session packet 1201 having a source address (SA) of 1.1.1.1; a source port number of 10 (i.e., the original SP); a destination address of 5.5.5.5; a destination port number of 20 (i.e., the original DP); and a protocol identifier of 100. Because AIPR 1 708 is the default router/gateway for source 1.1.1.1, the session packet 1201 is routed by the network to AIPR 1 708.

Based on the 5-tuple information contained in the received session packet 1201 and the Return Association stored in memory by AIPR 1 708, AIPR 1 708 is able to determine that the received session packet 1201 is associated with Session X. AIPR 1 708 forwards the packet according to the Forward Association information associated with Session X as shown in FIG. 9. Specifically, the forwarded session packet 1202 transmitted by AIPR 1 708 has a source address (SA) of 2.2.2.2; a source port number of 30 (i.e., the SSP assigned by AIPR 1 708); a destination address of 3.3.3.3; a destination port number of 40 (i.e., the SDP assigned by AIPR 1 708); and a protocol identifier of 100.

Since the forwarded session packet 1202 has a destination address of 3.3.3.3 (i.e., the network address of AIPR 2 714), the session packet 1202 is routed to AIPR 2 714. Based on the 5-tuple information contained in the received session packet 1202 and the Return Association stored in memory by AIPR 2 714, AIPR 2 714 is able to determine that the received session packet 1202 is associated with Session X. AIPR 2 714 forwards the packet according to the Forward Association information associated with Session X as shown in FIG. 10. Specifically, the forwarded session packet 1203 transmitted by AIPR 2 714 has a source address (SA) of 3.3.3.3; a source port number of 50 (i.e., the SSP assigned by AIPR 2 714); a destination address of 4.4.4.4; a destination port number of 60 (i.e., the SDP assigned by AIPR 2 714); and a protocol identifier of 100.

Since the forwarded session packet 1203 has a destination address of 4.4.4.4 (i.e., the network address of AIPR 4 722), the session packet 1203 is routed to AIPR 4 722. Based on the 5-tuple information contained in the received session packet 1203 and the Return Association stored in memory by AIPR 4 722, AIPR 4 722 is able to determine that the received session packet 1203 is associated with Session X. AIPR 4 722 forwards the packet according to the Forward Association information associated with Session X as shown in FIG. 11. Specifically, the forwarded session packet 1204 transmitted by AIPR 4 722 has a source address (SA) of 1.1.1.1 (i.e., the original source address); a source port number of 10 (i.e., the original SP); a destination address of 5.5.5.5 (i.e., the original destination address); a destination port number of 20 (i.e., the original DP); and a protocol identifier of 100.

Since the forwarded session packet 1204 has a destination address of 5.5.5.5 (i.e., the network address of destination service node 728), the forwarded session packet 1204 is routed to the destination service node 728, which processes the packet.

FIG. 13 is a schematic diagram providing an example of session packet processing for a return packet sent by the destination device to the source device through the AIPR devices for the session established in FIG. 8.

Here, the destination service node 728 sends a return packet 1301 having a source address (SA) of 5.5.5.5; a source port number of 20 (i.e., the original DP); a destination address of 1.1.1.1 (i.e., the original source address); a destination port number of 10 (i.e., the original SP); and a protocol identifier of 100. In this example, AIPR 4 722 is the default router/gateway for destination 5.5.5.5, so the return packet 1301 is routed by the network to AIPR 4 722.

Based on the 5-tuple information contained in the received return packet 1301 and the Forward Association stored in memory by AIPR 4 722, AIPR 4 722 is able to determine that the received return packet 1301 is associated with Session X. AIPR 4 722 forwards the packet according to the Return Association information associated with Session X as shown in FIG. 11. Specifically, the forwarded return packet 1302 transmitted by AIPR 4 722 has a source address (SA) of 4.4.4.4; a source port number of 60 (i.e., the SDP assigned by AIPR 2 714); a destination address of 3.3.3.3; a destination port number of 50 (i.e., the SSP assigned by AIPR 2 714); and a protocol identifier of 100.

Since the forwarded return packet 1302 has a destination address of 3.3.3.3 (i.e., the network address of AIPR 2 714), the return packet 1302 is routed to AIPR 2 714. Based on the 5-tuple information contained in the received return packet 1302 and the Forward Association stored in memory by AIPR 2 714, AIPR 2 714 is able to determine that the received return packet 1302 is associated with Session X. AIPR 2 714 forwards the packet according to the Return Association information associated with Session X as shown in FIG. 10. Specifically, the forwarded return packet 1303 transmitted by AIPR 2 714 has a source address (SA) of 3.3.3.3; a source port number of 40 (i.e., the SDP assigned by AIPR 1 708); a destination address of 2.2.2.2; a destination port number of 30 (i.e., the SSP assigned by AIPR 1 708); and a protocol identifier of 100.

Since the forwarded return packet 1303 has a destination address of 2.2.2.2 (i.e., the network address of AIPR 1 708), the return packet 1303 is routed to AIPR 1 708. Based on the 5-tuple information contained in the received return packet 1303 and the Forward Association stored in memory by AIPR 1 708, AIPR 1 708 is able to determine that the received return packet 1303 is associated with Session X. AIPR 1 708 forwards the packet according to the Return Association information associated with Session X as shown in FIG. 9. Specifically, the forwarded return packet 1304 transmitted by AIPR 1 708 has a source address (SA) of 5.5.5.5; a source port number of 20 (i.e., the original DP); a destination address of 1.1.1.1; a destination port number of 10 (i.e., the original SP); and a protocol identifier of 100.

Since the forwarded return packet 1304 has a destination address of 1.1.1.1 (i.e., the network address of source client node 726), the forwarded return packet 1304 is routed to the source client node 726, which processes the packet.

It should be noted that an AIPR can assign source and destination port numbers in any of a variety of ways (e.g., sequentially, non-sequentially, and randomly).

Figure 14:
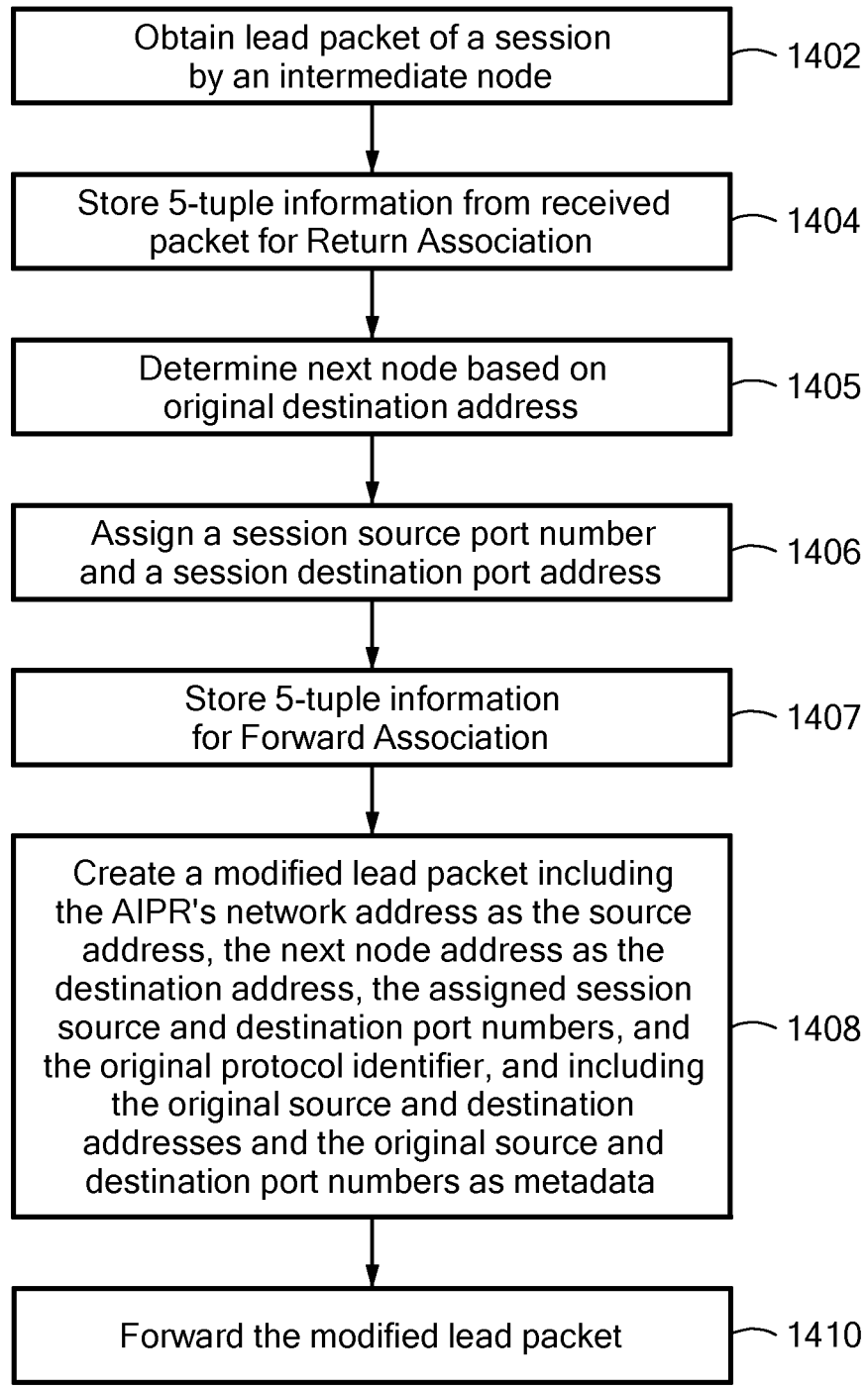
FIG. 14 is a flowchart schematically illustrating some lead packet processing operations performed by an AIPR, in accordance with one exemplary embodiment.

FIG. 14 is a flowchart schematically illustrating some lead packet processing operations performed by an intermediate AIPR, in accordance with one exemplary embodiment.

In block 1402, an intermediate AIPR obtains the lead packet of a session. In block 1404, the AIPR stores 5-tuple information from the received packet as Return Association information for the session.

In block 1405, the AIPR determines the next node/waypoint AIPR based on the original destination address. This typically involves accessing the AIPR's routing information base from which the AIPR can determine the outgoing port and next waypoint AIPR (if any) for the original destination address. As noted above, this preferably involves use of the session balancer 550 and the process of FIG. 5.

In block 1406, the AIPR assigns a session source port number and a session destination port number.

In block 1407, the AIPR stores 5-tuple information for a Forward Association. The Forward Association includes the AIPR's network address as the source address, the next node address as the destination address, the assigned session source and destination port numbers, and the original protocol identifier.

In block 1408, the AIPR creates a modified lead packet including the AIPR network address as the source address, the next node address as the destination address, the assigned session source and destination port numbers, and the original protocol identifier, and also including the original source and destination addresses and the original source and destination port numbers as metadata. In block 1410, the AIPR forwards the modified lead packet.

It should be noted that the flowchart of FIG. 14 applies to intermediate AIPRs other than the final waypoint AIPR, which performs slightly different processing as discussed above (e.g., the final waypoint AIPR uses the original source address, original source port number, original destination address, and original destination port number contained in the metadata of the received packet for its Forward Association information).

Figure 15:
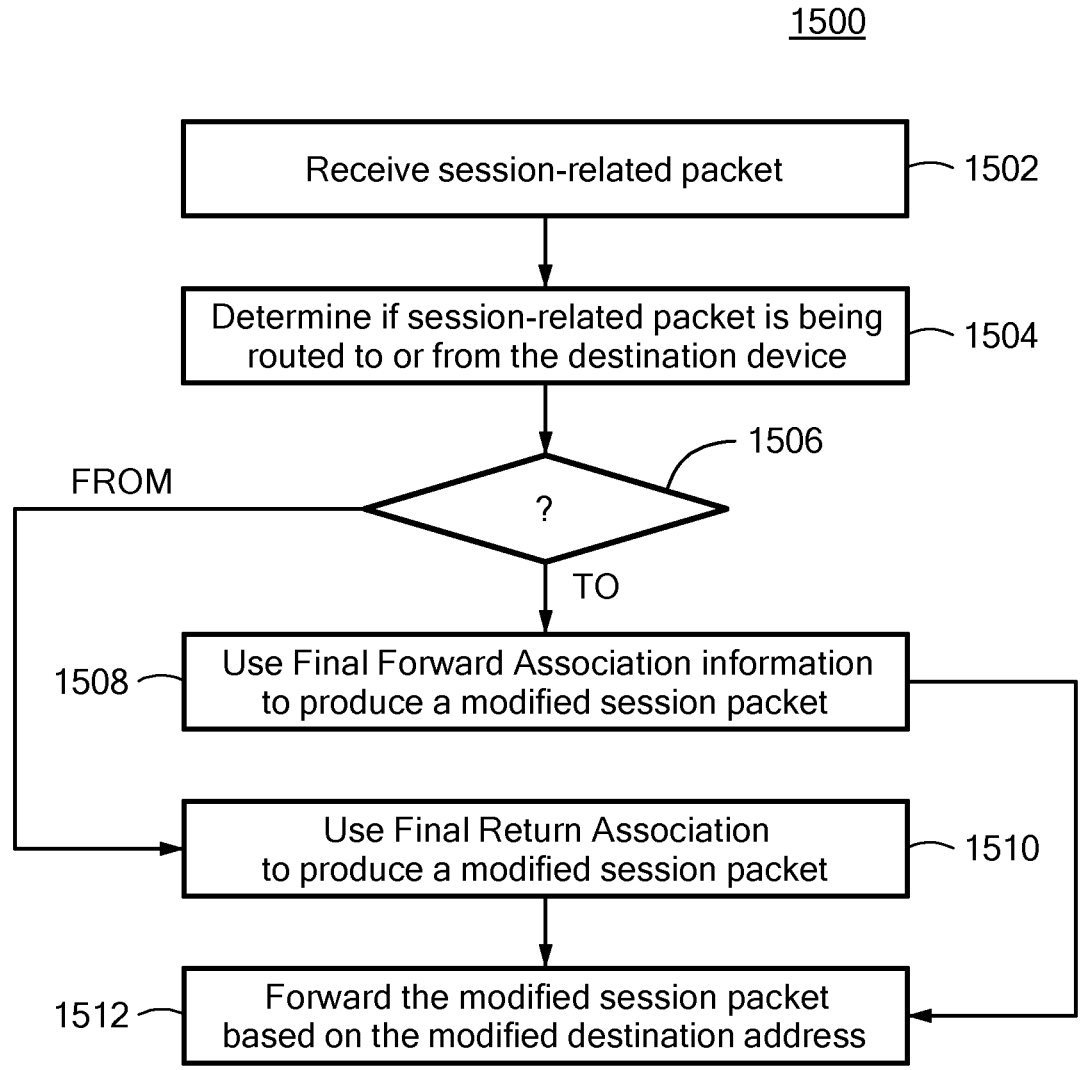
FIG. 15 is a flowchart schematically illustrating some session packet processing operations performed by an AIPR, in accordance with one exemplary embodiment.

FIG. 15 is a flowchart schematically illustrating some packet processing operations performed by an AIPR, in accordance with one exemplary embodiment. In block 1502, the AIPR receives a session-related packet. In block 1504, the AIPR determines if the session-related packet is being routed to or from the destination device. If the session-related packet is being routed to the destination device in block 1506, then the AIPR uses the Final Forward Association information to produce a modified session packet, in block 1508. If, however, the session-related packet is being routed from the destination device in block 1506, then the AIPR uses the Final Return Association information to produce a modified session packet, in block 1510. In either case, the AIPR forwards the modified session packet based on the modified destination address, in block 1512.

Stateful routing can be accomplished without presuming that each AIPR has a priori knowledge of the other AIPRs in the network in relation to the network/next hop associations contained in its routing information base. For example, a particular AIPR may not know the next waypoint AIPR (if any) to use for the destination network address. Rather, each waypoint AIPR can determine the presence or absence of a next waypoint AIPR after forwarding a modified lead packet.

By way of example with reference to FIG. 8, assuming AIPR 1 708 receives the original lead packet 801 from source client node 726, AIPR 1 708 identifies the lead packet 801 as the lead packet for a new session as discussed above, and also determines that the lead packet 801 is not a modified lead packet containing session metadata. Therefore, AIPR 1 708 determines that it is the first waypoint AIPR for the session. AIPR 1 708 stores information from the received lead packet 801, such as the source address, the source port number, the destination port number, and the protocol identifier.

Since AIPR 1 708 is the first waypoint AIPR, AIPR 1 708 is able to determine that future session-related packets received from the source client node 726 will have a source address (SA) of 1.1.1.1; a source port number of 10; a destination address of 5.5.5.5; a destination port number of 20; and a protocol identifier of 100.

To forward a modified lead packet, AIPR 1 708 does not know whether or not there is a next hop AIPR through which the modified lead packet will traverse. Therefore, rather than changing both the source address field and the destination address field in the lead packet, AIPR 1 708 may change just the source address field to be the network address of AIPR 1 708 (i.e., 2.2.2.2) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 1 708 may include the following information:

| | | |
|---|---|---|
| SA | 2.2.2.2 | |
| SP | 10 | |
| DA | 5.5.5.5 | |
| DP | 20 | |
| PR | 100 | |
| SSP | 30 | (session source port number assigned by AIPR 1 708) |
| SDP | 40 | (session destination port number assigned by AIPR 1 708) |

In this way, the modified lead packet transmitted by AIPR 1 708 will be routed based on the destination address of 5.5.5.5 and therefore may or may not traverse another AIPR on its way to destination service node 728. At this point, AIPR 1 708 does not know the destination address that will be used for session-related packets forwarded over an outgoing interface (since AIPR 1 708 does not determine until later whether or not it is the final waypoint AIPR between the source client node 726 and the destination service node 728).

Assume that the modified lead packet transmitted by AIPR 1 708 reaches AIPR 2 714. AIPR 2 714 identifies the modified lead packet as a lead packet for a new session as discussed above, and also determines that the modified lead packet is a modified lead packet containing session metadata. Therefore, AIPR 2 714 determines that it is not the first waypoint AIPR for the session. At this time, AIPR 2 714 is unable to determine whether or not it is the final waypoint AIPR for the session. AIPR 2 714 stores information from the received modified lead packet, such as the source address, the source port number, the destination port number, and the protocol identifier.

Since AIPR 2 714 is not the first waypoint AIPR, AIPR 2 714 is able to determine that future session-related packets received from AIPR 1 708 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

To forward a modified lead packet, AIPR 2 714 does not know whether or not there is a next hop AIPR through which the modified lead packet will traverse. Therefore, rather than changing both the source address field and the destination address field in the lead packet, AIPR 2 714 may change just the source address field to be the network address of AIPR 2 714 (i.e., 3.3.3.3) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 2 714 may include the following information:

| | | |
|---|---|---|
| SA | 3.3.3.3 | |
| SP | 10 | |
| DA | 5.5.5.5 | |
| DP | 20 | |
| PR | 100 | |
| SSP | 50 | (session source port number assigned by AIPR 2 714) |
| SDP | 60 | (session destination port number assigned by AIPR 2 714) |

In this way, the modified lead packet transmitted by AIPR 2 714 will be routed based on the destination address of 5.5.5.5 and therefore may or may not traverse another AIPR on its way to destination service node 728. At this point, AIPR 2 714 does not know the destination address that will be used for session-related packets forwarded over an outgoing interface (since AIPR 2 714 does not determine until later whether or not it is the final waypoint AIPR between the source client node 726 and the destination service node 728).

At some point, AIPR 2 714 identifies itself to AIPR 1 708 as a waypoint AIPR for the session (e.g., upon receipt of the modified lead packet from AIPR 1 708 or in a return packet associated with the session). This allows AIPR 1 708 to determine that it is not the final waypoint AIPR and therefore also allows AIPR 1 708 to determine the forward association parameters to use for forwarding session-related packets, i.e., AIPR 1 708 is able to determine that future session-related packets sent to AIPR 2 714 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

Assume that the modified lead packet transmitted by AIPR 2 714 reaches AIPR 4 722. AIPR 4 722 identifies the modified lead packet as a lead packet for a new session as discussed above, and also determines that the modified lead packet is a modified lead packet containing session metadata. Therefore, AIPR 4 722 determines that it is not the first waypoint AIPR for the session. At this time, AIPR 4 722 is unable to determine whether or not it is the final waypoint AIPR for the session. AIPR 4 722 stores information from the received modified lead packet, such as the source address, the source port number, the destination port number, and the protocol identifier.

Since AIPR 4 722 is not the first waypoint AIPR, AIPR 4 722 is able to determine that future session-related packets received from AIPR 2 714 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

To forward a modified lead packet, AIPR 4 722 does not know whether or not there is a next hop AIPR through which the modified lead packet will traverse. Therefore, rather than changing both the source address field and the destination address field in the lead packet, AIPR 4 722 may change just the source address field to be the network address of AIPR 4 722 (i.e., 4.4.4.4) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 4 722 may include the following information:

| | | |
|---|---|---|
| SA | 4.4.4.4 | |
| SP | 10 | |
| DA | 5.5.5.5 | |
| DP | 20 | |
| PR | 100 | |
| SSP | 70 | (session source port number assigned by AIPR 4 722) |
| SDP | 80 | (session destination port number assigned by AIPR 4 722) |

In this way, the modified lead packet transmitted by AIPR 4 722 will be routed based on the destination address of 5.5.5.5 and therefore may or may not traverse another AIPR on its way to destination service node 728. At this point, AIPR 4 722 does not know the destination address that will be used for session-related packets forwarded over an outgoing interface (since AIPR 4 722 does not determine until later whether or not it is the final waypoint AIPR between the source client node 726 and the destination service node 728).

At some point, AIPR 4 722 identifies itself to AIPR 2 714 as a waypoint AIPR for the session (e.g., upon receipt of the modified lead packet from AIPR 2 714 or in a return packet associated with the session). This allows AIPR 2 714 to determine that it is not the final waypoint AIPR and therefore also allows AIPR 2 714 to determine the forward association parameters to use for forwarding session-related packets, i.e., AIPR 2 714 is able to determine that future session-related packets sent to AIPR 4 722 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

Assume that the modified lead packet transmitted by AIPR 4 722 reaches the destination service node 728, which processes the modified lead packet without reference to the session metadata contained in the packet. Typically, this includes the destination device sending a reply packet back toward the source client node 726.

Since AIPR 4 722 receives a packet from the destination service node 728, as opposed to another waypoint AIPR, AIPR 4 722 is able to determine that it is the final waypoint AIPR and therefore also is able to determine the forward association parameters to use for forwarding session-related packets, i.e., AIPR 4 722 is able to determine that future session-related packets sent to the destination service node 728 will have a source address (SA) of 4.4.4.4; a source port number of 10 (i.e., the original SP); a destination address of 5.5.5.5; a destination port number of 20 (i.e., the original DP); and a protocol identifier of 100.

After the lead packet has been processed and the session-related information has been established by the waypoint AIPRs hop-by-hop from the source client node 726 to the destination service node 728, additional packets may be exchanged between the source client node 726 and the destination service node 728 to establish an end-to-end communication session between the source client node 726 and the destination service node 728.

Lead Packet Identification in Stateful Session

As noted above, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, a TCP session may be ended by including a FIN flag in a packet and having the other node send an ACK, or by simply including an RST flag in a packet. Because each waypoint stores information about each session, such as the source/destination network address and port number pairs, the waypoint can identify the session with which each received packet is associated. The waypoint can follow the protocol state of each session by monitoring the messages and flags, such as SYN and FIN, sent by the endpoints of the session and storing state information about each session in its database.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

The following table describes exemplary techniques for identifying the beginning and end of a session, according to various protocols. Similar techniques may be developed for other protocols, based on the definitions of the protocols.

| Protocol | Destination Port | Technique for Start/End Determination |
|---|---|---|
| TCP | Any | Detect start on the first SYN packet from a new address/port unique within the TCP protocol's guard time between address/port reuse. Following the TCP state machine to determine an end (FIN exchange, RST, or guard timeout). |

-continued

| Protocol | Destination Port | Technique for Start/End Determination |
|---|---|---|
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller. |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 16:
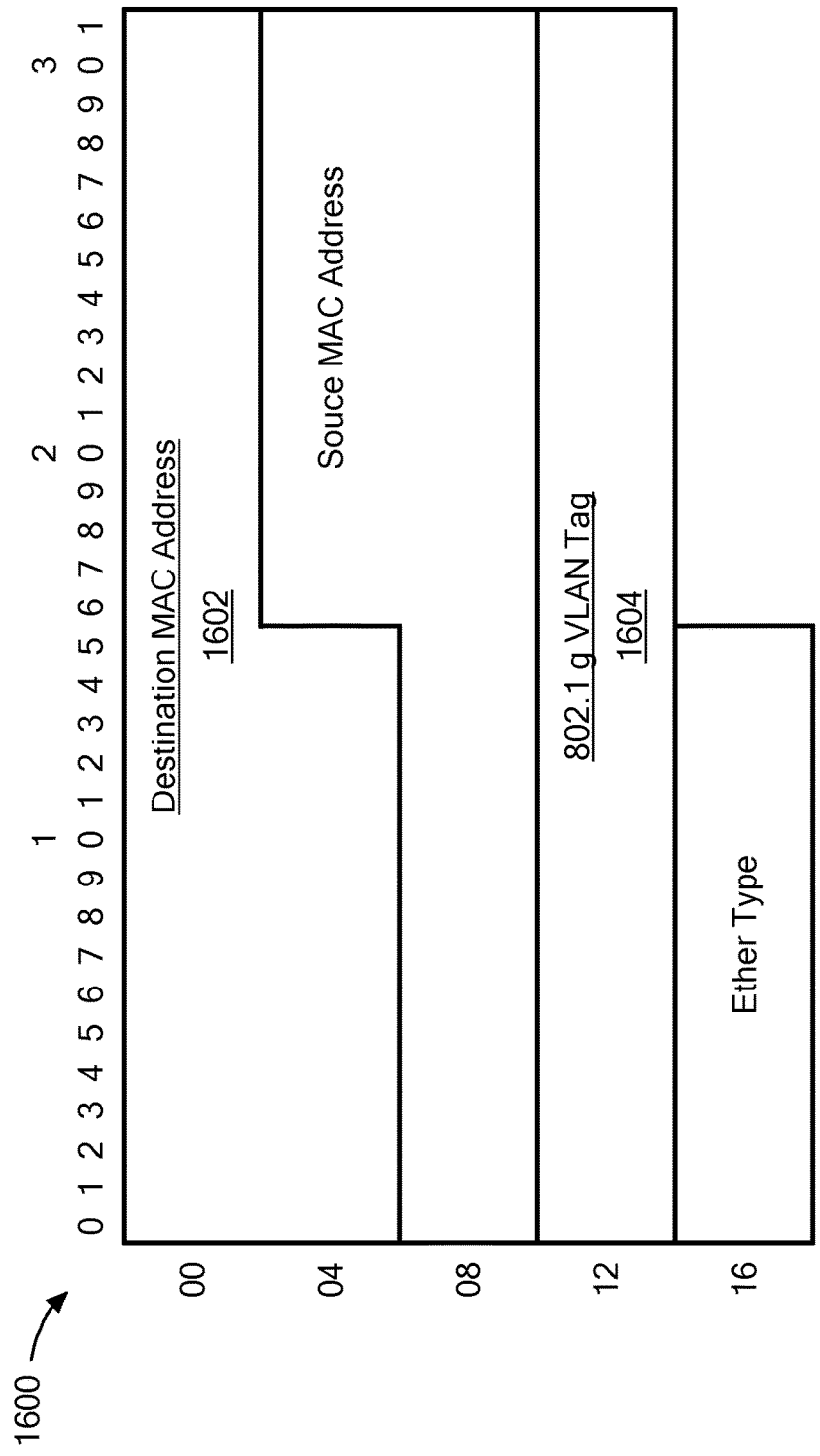
FIG. 16 schematically shows a layout of an Ethernet header, identifying fields used for identifying a beginning of a session, in accordance with one exemplary embodiment.

FIG. 16 is a schematic layout of an Ethernet header 1600, including a Destination MAC Address 1602 and an 802.1q VLAN Tag 1604.

Figure 17:
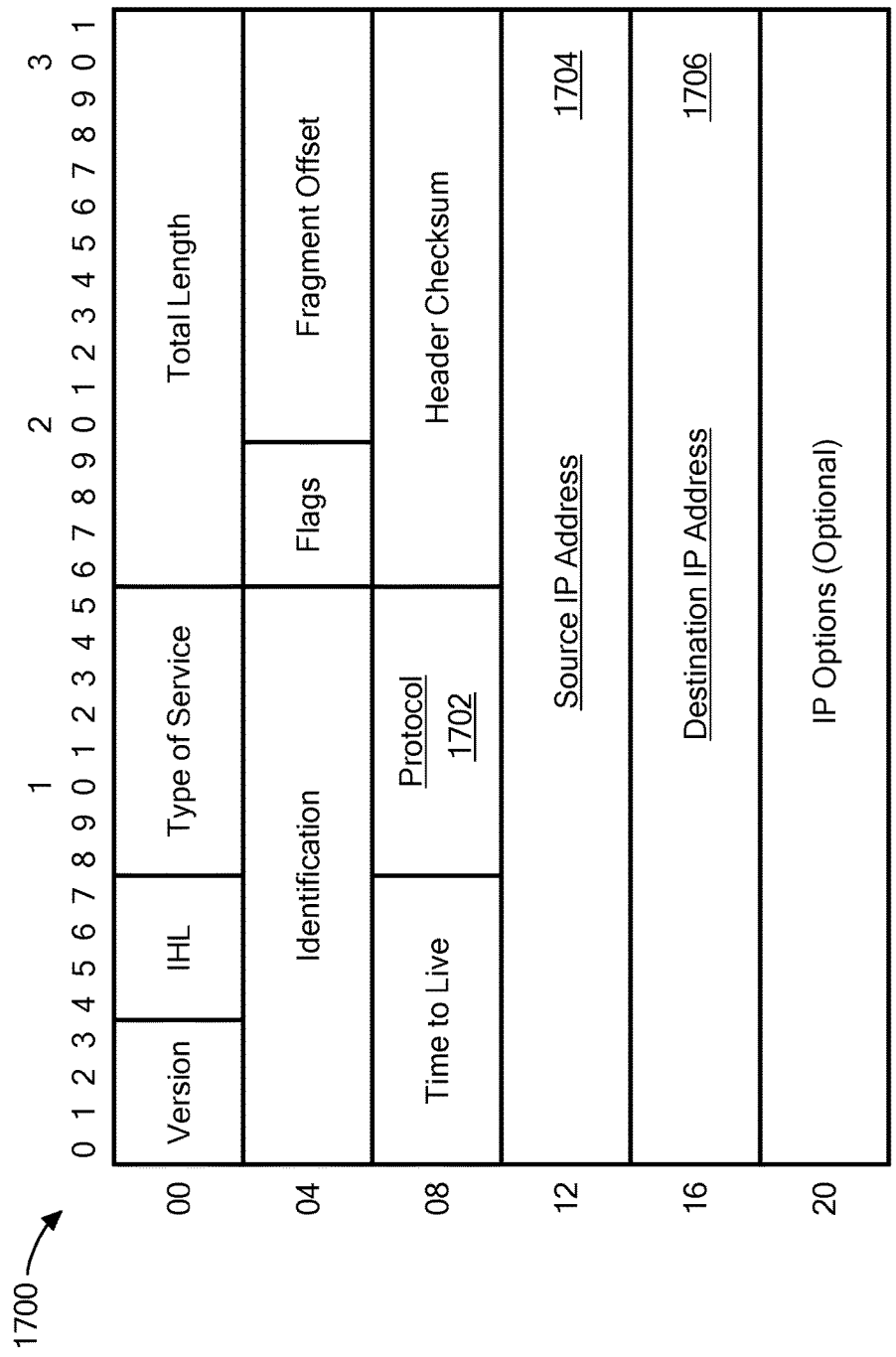
FIG. 17 schematically shows a layout of an IP header, identifying fields used for identifying a beginning of a session, in accordance with one exemplary embodiment.

FIG. 17 is a schematic layout of an IPv4 header 1700, including a Protocol field 1702, a Source IP Address 1704 and a Destination IP Address 1706. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit IP addresses, whereas IPv6 utilizes 128 bit IP addresses. In addition, IPv6 can support larger datagram sizes.

Figure 18:
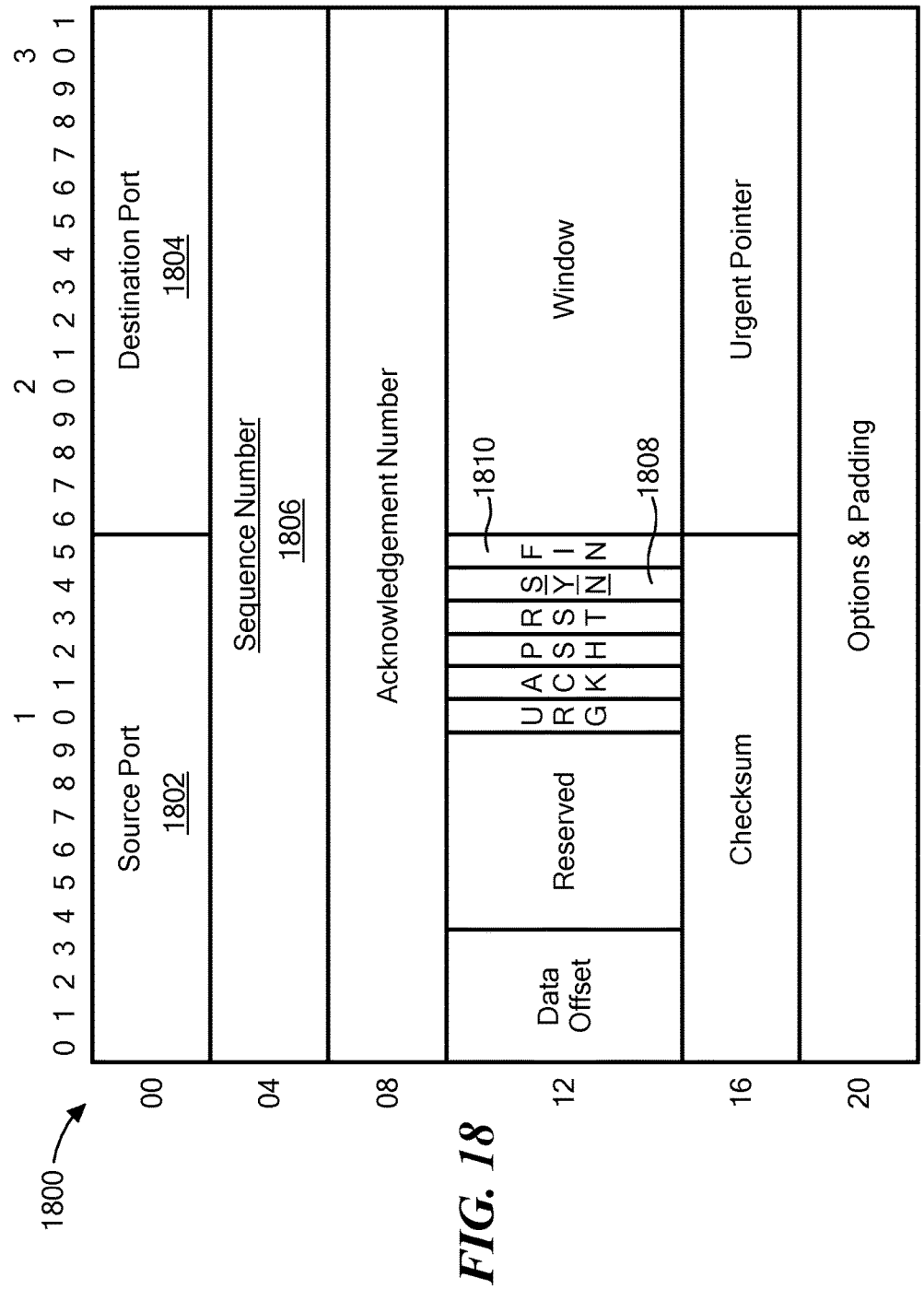
FIG. 18 schematically shows a layout of a TCP header, identifying fields used for identifying a beginning of a session, in accordance with one exemplary embodiment.

FIG. 18 is a schematic layout of a TCP header 1800, including a Source Port 1802, a Destination Port 1804, a Sequence Number 1806, a SYN flag 1808 and a FIN flag 1810. TCP is described generally in IETF RFC 793, which is hereby incorporated herein by reference in its entirety. Similar to TCP, the UDP header includes a Source Port field and a Destination Port field. UDP is described generally in IETF RFC 768, which is hereby incorporated herein by reference in its entirety.

These packets and the identified fields may be used to identify the beginning of a session, as summarized in the following table.

| Data Item | Where From | Description |
|---|---|---|
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP or UDP Header | Defines the flow instance from the source. This may reflect a client, a firewall in front of the client, or a carrier grade NAT. |
| Destination Port | TCP or UDP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

The lead packet, and hence the session identifying information, can include information from a single field or can include information from multiple fields. In certain exemplary embodiments, sessions are based on a "5-tuple" of information including the source IP address, source port number, destination IP address, destination port number, and protocol from the IP and TCP headers.

Augmented IP Router (AIPR)

Figure 19:
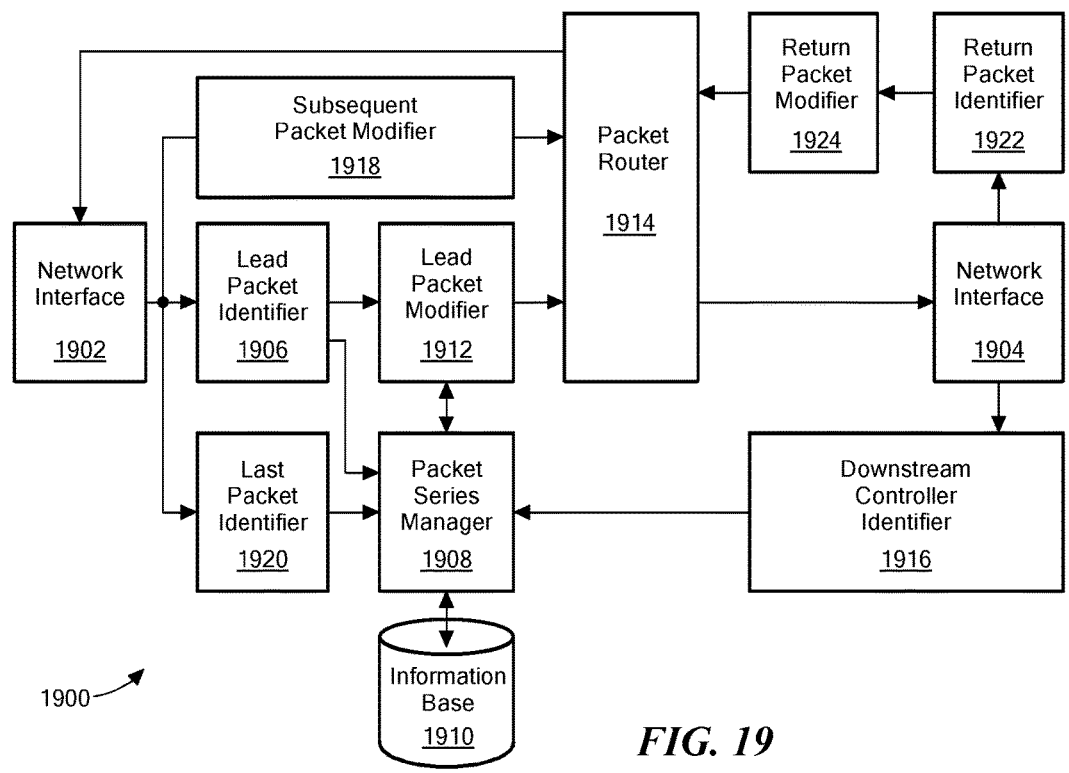
FIG. 19 schematically shows a block diagram of an AIPR of FIG. 7, in accordance with one exemplary embodiment.

FIG. 19 is a schematic block diagram of an exemplary AIPR (waypoint) 1900 configured in accordance with illustrative embodiments of the invention. The AIPR 1900 includes at least two network interfaces 1902 and 1904, through which the AIPR 1900 may be coupled to two networks. The interfaces 1902 and 1904 may be, for example, Ethernet interfaces. The AIPR 1900 may send and receive packets via the interfaces 1902 and 1904.

A lead packet identifier 1906 automatically identifies lead packets, as discussed herein. In general, the lead packet identifier 1906 identifies a lead packet when the lead packet identifier 1906 receives a packet related to a session that is not already represented in the AIPR's information base 1910, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 1908 is coupled to the lead packet identifier 1906. For each session, the session manager assigns a unique identifier. The unique identifier may be, for example, a combination of the network address of the AIPR 1900 or of the interface 1902, in combination with a first port number assigned by the session manager 1908 for receiving subsequent packets of this session. The unique identifier may further include the network address of the AIPR 1900 or of the other interface 1904, in combination with a second port number assigned by the session manager 1908 for transmitting the lead packet and subsequent packets. This unique identifier is associated with the session. The session manager 1908 stores information about the session in an information base 1910. This information may include the unique identifier, in association with the original source client/destination service network address/port number pairs.

Figure 20:
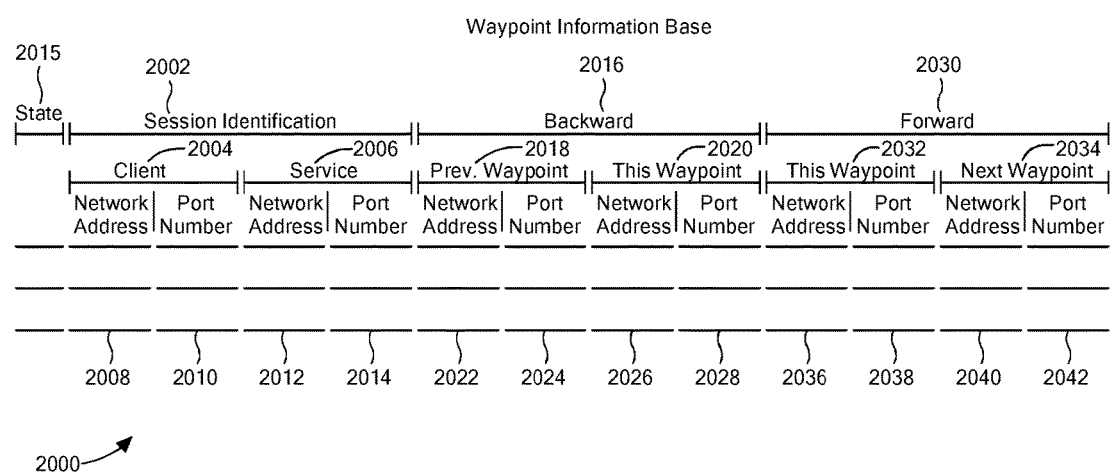
FIG. 20 shows a schematic illustration of information stored in an information base by the AIPR of FIGS. 7 and 19, in accordance with one exemplary embodiment.

FIG. 20 is a schematic layout of an exemplary waypoint information base 2000. Each row represents a session. A session identification column 2002 includes sub-columns for the source client 2004 and the destination service 2006. For each client 2004, its network address 2008 and port number 2010 are stored. For each destination service 2006, its network address 2012 and port number 2014 are stored. This information is extracted from the lead packet.

State information about the session may be stored in a state column 2015. This information may be used to statefully follow a series of packets, such as when a session is being initiated or ended.

A backward column includes sub-columns for storing information 2016 about a portion of the backward path, specifically to the previous AIPR. The backward path information 2016 includes information 2018 about the previous AIPR and information 2020 about the present AIPR 1900. The information 2018 about the previous AIPR includes the AIPR's network address 2022 and port number 2024. The session manager 1908 extracts this information from the lead packet, assuming the lead packet was forwarded by an AIPR. If, however, the present AIPR 1900 is the first AIPR to process the lead packet, the information 2018 is left blank as a flag. The information 2020 about the present AIPR 1900 includes the network address 2026 of the interface 1902 over which the lead packet was received, as well as the first port number 2028 assigned by session manager 1908.

The waypoint information base 2000 is also configured to store information 2030 about a portion of the forward path (of a session), specifically to the next AIPR. This information 2030 includes information 2032 about the present AIPR 1900 and information 2034 about the next AIPR along the path, assuming there is a next AIPR. The information 2032 includes the network address 2036 of the interface over which the present AIPR will send the lead packet and subsequent packets, as well as the second port number 2038 assigned by the session manager 1908. The information 2034 about the next AIPR along the path may not yet be available, unless the AIPR is provisioned with information about the forward path. The information 2034 about the next AIPR includes its network address 2040 and port number 2042. If the information 2034 about the next AIPR is not yet available, the information 2034 may be filled in when the AIPR 1900 processes a return packet, as described below, or as when determined using the process of FIG. 5.

Some embodiments of the waypoint information base 2000 may include the forward information 2030 without the backward information 2016. Other embodiments of the waypoint information base 2000 may include the backward information 2016 without the forward information 2030. Statistical information may be gathered and/or calculated using either or both forward and backward information 2016.

Returning to FIG. 19, a lead packet modifier 1912 is coupled to the session manager 1908. The lead packet modifier 1912 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 21:
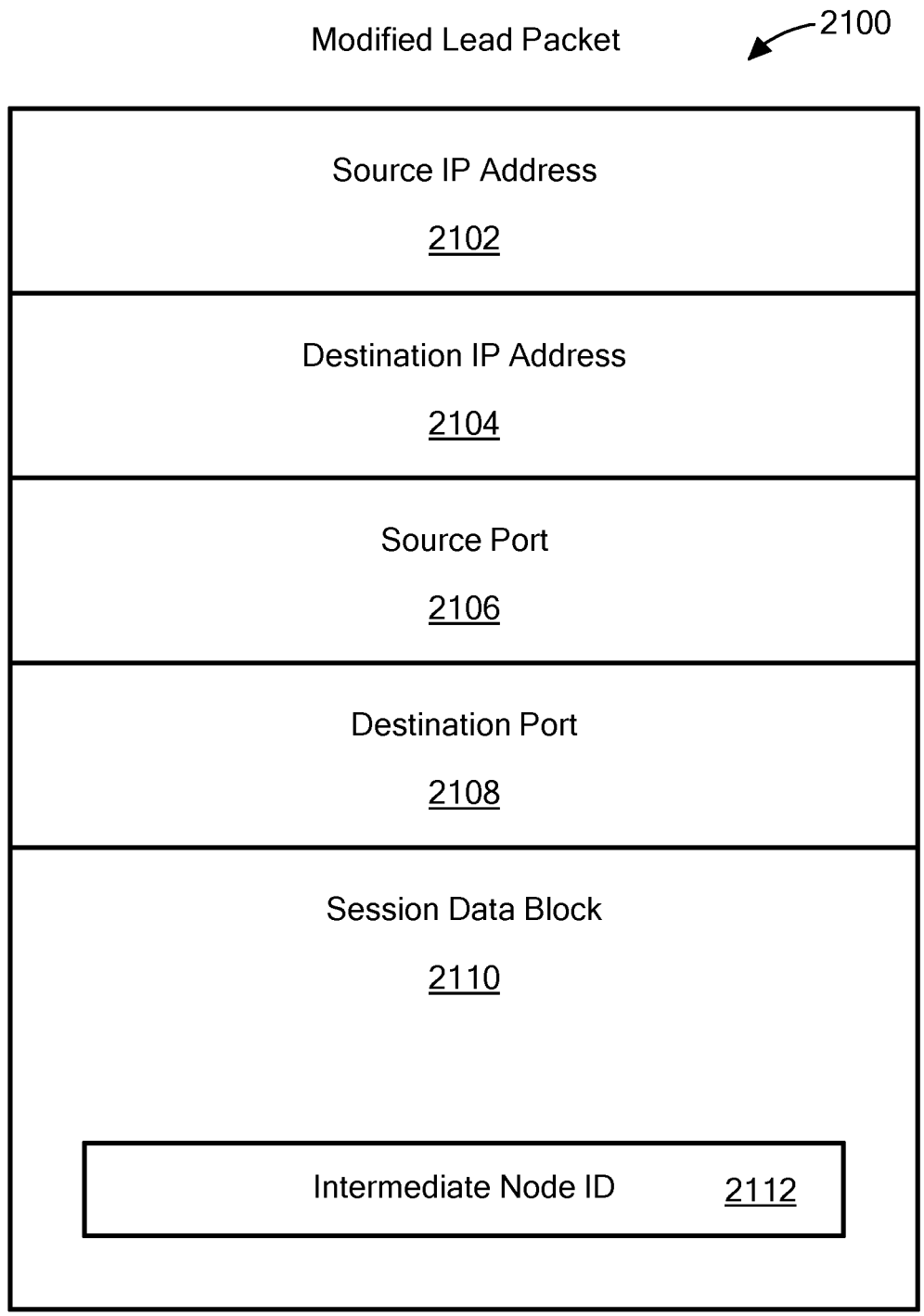
FIG. 21 schematically shows a modified lead packet produced by the AIPR of FIGS. 7 and 19, in accordance with one exemplary embodiment.

FIG. 21 is a schematic diagram of an exemplary modified lead packet 2100 showing the original source and destination IP addresses 2102 and 2104, respectively, and the original source and destination port numbers 2106 and 2108, respectively. FIG. 21 also shows a session data block 2110 in the modified lead packet 2100. Although the session data block 2110 is shown as being contiguous, it may instead have its contents distributed throughout the modified lead packet 2100. The session data block 2110 may store an identification of the sending AIPR, i.e., an intermediate node identifier 2112, such as the network address of the second network interface 2104 and the second port number.

Returning to FIG. 21, the lead packet modifier 2112 updates the packet length, if necessary, to reflect any enlargement of the packet. The lead packet modifier 2112 updates the checksum of the packet to reflect the modifications made to the packet. The modified lead packet is then transmitted by a packet router 1914, via the second network interface 1904. The modified lead packet is naturally routed, unless the AIPR 1900 has been provisioned with forward path information.

Eventually, the destination service sends a return packet. The AIPR 1900 receives the return packet via the second interface 1904. If another AIPR (downstream AIPR) between the present AIPR 1900 and the destination service handles the lead packet and the return packet, the downstream AIPR modifies the return packet to include the downstream AIPR's network address and a port number. A downstream controller 1916 identifier uses stateful inspection, as described herein, to identify the return packet. The downstream controller 1916 stores information 2034 (FIG. 20), specifically the network address and port number, about the next AIPR in the waypoint information base 2000. The present AIPR 1900 may use this information to address subsequent packets to the next AIPR. Specifically, a subsequent packet modifier 1918 may set the destination address of the subsequent packets to the network address and port number 2040 and 2042 (FIG. 20) of the next waypoint, instead of directly to the destination service. The packet router 1914 sends the subsequent packets, according to their modified destination addresses. Thus, for each series of packets, subsequent packets flow through the same downstream packet flow controllers as the lead packet of the series of packets.

A last packet identifier 1920 statefully follows each session, so as to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 1908 disassociates the unique identifier from the session and deletes information about the session from the waypoint information base 2000.

Where the AIPR 1900 is provisioned to be a last AIPR before a destination service, the lead packet modifier 1906 restores the lead packet to the state the lead packet was in when the source client sent the lead packet, or as the lead packet was modified, such as a result of network address translation (NAT). Similarly, the subsequent packet modifier 1918 restores subsequent packets.

Similarly, if the destination address of the lead packet is the same as the network address of the AIPR 1900, or its network interface 1902 over which it receives the lead packets, the lead packet modifier 1906 and the subsequent packet modifier 1918 restore the packet and subsequent packets.

As noted, in some protocols, several packets are required to initiate a session, as with the SYN-SYN/ACK-ACK handshake of the TCP. Thus, the downstream controller identifier 1916 may wait until a second return packet is received from the destination service before considering a session as having started.

As noted, some embodiments of the waypoint 1900 also manage return packet paths. The lead packet identifier 1906 automatically ascertains whether a lead packet was forwarded to the waypoint 1900 by an upstream waypoint. If the lead packet includes a session data block, an upstream waypoint forwarded the lead packet. The packet series manager 1908 stores information about the upstream waypoint in the waypoint information base 1910. A return packet identifier 1922 receives return packets from the second network interface 1904 and automatically identifies return packets of the session. These return packets may be identified by destination address and port number being equal to the information 2032 (FIG. 20) in the waypoint information base corresponding to the session. A return packet modifier modifies the return packets to address them to the upstream waypoint for the session, as identified by the information 2018 in the waypoint information base 2000.

Figure 22:
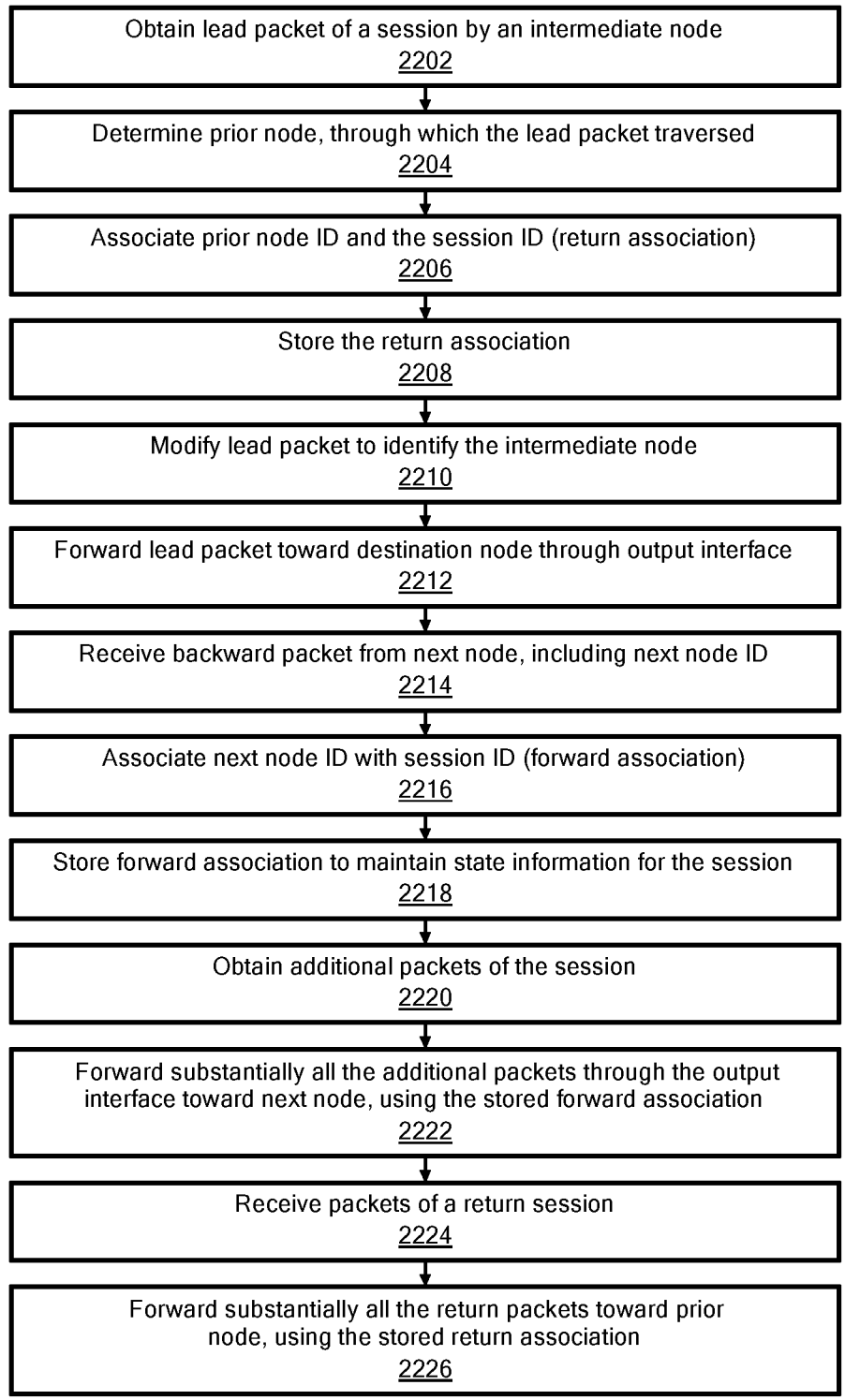
FIG. 22 is a flowchart illustrating some of the operations performed by the AIPR of FIGS. 7 and 19, in accordance with one exemplary embodiment.

FIG. 22 shows a flowchart schematically illustrating some operations performed by the AIPR 1900 (FIG. 19) in accordance with illustrative embodiments of the invention. The flowchart illustrates a packet routing method for directing packets of a session from an originating node toward a destination node in an IP network. At 2202, an intermediate node obtains a lead packet of a plurality of packets in a session. The intermediate node may include a routing device or a switching device that performs a routing function.

The packets in the session have a unique session identifier. At 2204, a prior node, through which the lead packet traversed, is determined. The prior node has a prior node identifier. At 2206, a return association is formed between the prior node identifier and the session identifier. At 2208, the return association is stored in memory to maintain state information for the session.

At 2210, the lead packet is modified to identify at least the intermediate node. At 2212, the lead packet is forwarded toward the destination node though an intermediate node electronic output interface to the IP network. The next hop node may be determined any number of ways. The electronic output interface is in communication with the IP network. At 2214, a backward message (e.g., a packet, referred to as a "backward packet") is received through an electronic input interface of the intermediate node. The backward message is received from a next node having a next node identifier. The backward message includes the next node identifier and the session identifier. The electronic input interface is in communication with the IP network.

At 2216, a forward association is formed between the next node identifier and the session identifier. At 2218, the forward association is stored in memory, to maintain state information for the session. At 2220, additional packets of the session are obtained. At 2222, substantially all of the additional packets in the session are forwarded toward the next node, using the stored forward association. The additional packets are forwarded through the electronic output interface of the intermediate node.

At 2224, a plurality of packets is received in a return session, or a return portion of the session, from the destination. The return session is addressed toward the originating node. At 2226, substantially all the packets in the return session are forwarded toward the prior node, using the stored return association. The packets are forwarded through the electronic output interface.

Figure 23:
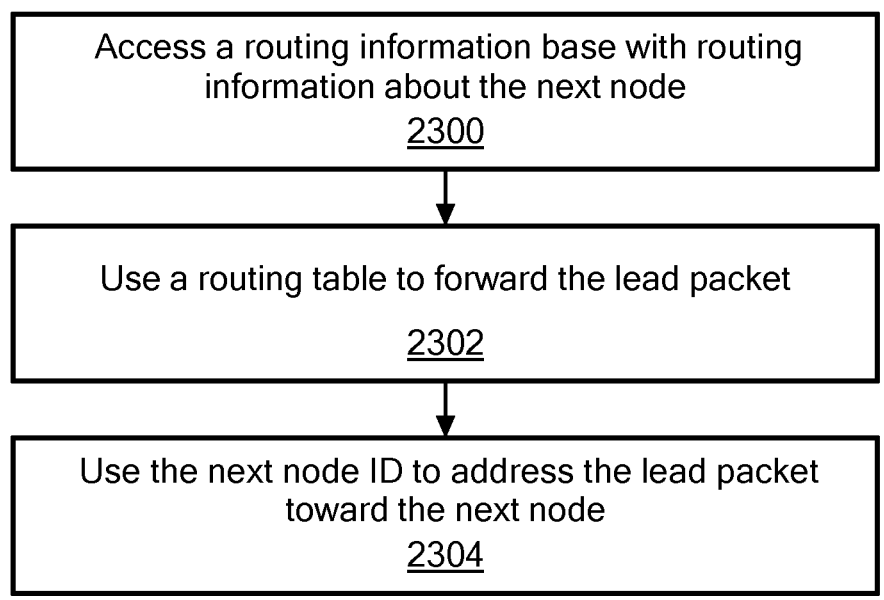
FIG. 23 is a flowchart illustrating some of the operations involved with forwarding a lead packet, in accordance with one exemplary embodiment.

FIG. 23 shows a high-level alternative process of managing the lead packet when establishing a session. As shown at 2300, forwarding the lead packet 2212 toward the destination node may include accessing a routing information base having routing information for the next hop node and other potential next nodes. As shown at 2302, the intermediate node may have a routing table, and forwarding the lead packet 2212 toward the destination node may include using the routing table to forward the lead packet toward the destination node and next hop node. As shown at 2304, forwarding the lead packet 2212 toward the destination node may include using the next node identifier to address the lead packet toward the next hop node. The lead packet may be addressed so that a plurality of network devices receives the lead packet after it is forwarded and before the next hop node receives the lead packet.

In a manner similar to other components discussed above, the AIPR 1900 and all or a portion of its components 1902-1924 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of securing session communications between a first network and a second network, the first network having a first encryption device configured to normally encrypt session communications between the first network and the second network, the method comprising:

initiating a given session of communication between the first network and the second network, wherein the given session is a stateful session, the stateful session ensuring that each session packet of the given session packets travels from the first network to the second network by following a given path, the given path including a particular set of nodes;

receiving, at the first network, given session packets of the given session between the first and second networks, the given session packets including an initial encrypted given session packet having protocol data relating to a given encryption protocol;

determining that at least one of the received given session packets is encrypted ("encrypted given session packet"), the given session involving a Layer 7 application that encrypted the at least one encrypted given session packet, wherein determining comprises reading the protocol data relating to the given encryption protocol in the initial encrypted given session packet;

overriding the normal encryption configuration to permit communication of the given session to the second network without further encrypting at least some of the encrypted given session packets; and controlling, in response to determining, the first encryption device to permit communication of the given session with the second network without further encrypting a plurality of the encrypted given session packets.

2. The method as defined by claim 1 wherein controlling the first encryption device comprises preventing double encryption of the at least one encrypted given session packet.

3. The method as defined by claim 1 wherein the first encryption device comprises an edge router.

4. The method as defined by claim 1 wherein the second network has a second encryption device to encrypt communication from the second network to the first network, the method further comprising:

in response to determining that at least one of the received session packets is encrypted, controlling the second encryption device to permit communication of the given session to the first network without further encrypting at least some of the encrypted given session packets.

5. The method as defined by claim 1 wherein the encrypted given session packets comply with at least one of IPSec or Transport Layer Security.

6. The method as defined by claim 1 wherein the encrypted given session packets have a header having encryption information, further wherein determining comprises:

locating and reading the encryption information in the header.

7. The method as defined by claim 1 wherein the at least one encrypted given session packet was received from the second network.

8. The method as defined by claim 1 wherein the Layer 7 application executes on at least one device in the first network.

9. An apparatus for securing session communications between a first network and a second network, the first network having a first encryption device configured to normally encrypt communications between the first network and the second network, the apparatus comprising:

an interface for receiving from a Layer 7 application, at the first network, given session packets of a given session between the first and second networks, wherein the given session is a stateful session, the stateful session ensuring that each session packet of the given session packets travels from the first network to the second network by following a given path, the given path including a particular set of nodes, the encrypted given session packets comprising an initial encrypted given session packet having protocol data relating to the given encryption protocol;
a parser operatively coupled with the interface, the parser being configured to determine, by reading the protocol data relating to the given encryption protocol in the initial encrypted given session packet, if at least one of the received given session packets is encrypted; and
a controller operatively coupled with the parser, the controller being configured to override the normal encryption configuration to permit communication of the given session to the second network without further encrypting at least some of the encrypted given session packets, and the controller being configured to control, in response to the parser determining, the first encryption device to permit communication of the given session with the second network without further encrypting a plurality of the encrypted given session packets.

10. The apparatus as defined by claim 9 wherein the interface, parser, and controller are part of the first encryption device.

11. The apparatus as defined by claim 9 wherein the first encryption device comprises an edge router.

12. The apparatus as defined by claim 9 wherein the encrypted given session packets comply with at least one of IPSec or Transport Layer Security.

13. The apparatus as defined by claim 9 wherein the received given session packets include a header, the parser being configured to determine if the header includes prescribed encryption information in the header.

14. The apparatus as defined by claim 9 wherein the at least one encrypted given session packet was received from the second network.

15. A computer program product for use on a computer system for securing session communications between a first network and a second network, the first network having a first encryption device configured to normally encrypt communications between the first network and the second network, the computer program product comprising a tangible, non-transient computer usable medium having computer readable program code thereon, the computer readable program code comprising:
program code for detecting initiation of a given communication session between the first network and the second network, the given session involving a Layer 7 application that encrypts an initial given session packet ("initial encrypted given session packet"), wherein the given session is a stateful session, the stateful session ensuring that each session packet of the given session travels from the first network to the second network by following a given path, the given path including a particular set of nodes;
program code for receiving the initial encrypted given session packet having protocol data relating to a given encryption protocol after detecting initiation;
program code for determining, by reading the protocol data relating to the given encryption protocol in the initial encrypted given session packet, that the initial encrypted given session packet,
program code for overriding the normal encryption configuration, to permit communication of the given session to the second network without further encrypting at least some of the encrypted given session packets; and
program code for controlling, in response to determining, the first encryption device to permit communication of the given session with the second network without further encrypting a plurality of the encrypted given session packets.

16. The computer program product as defined by claim 15 wherein the first encryption device comprises an edge router.

17. The computer program product as defined by claim 15 wherein the second network has a second encryption device to encrypt communication from the second network to the first network, the computer program product further comprising:
program code for controlling, in response to determining that at least one of the received session packets is encrypted, the second encryption device to permit communication of the given session to the first network without further encrypting at least some of the encrypted given session packets.

18. The computer program product as defined by claim 15 wherein the encrypted given session packets have a header with encryption information, further wherein the program code for determining comprises:
program code for locating and reading the encryption information in the header.

19. The computer program product as defined by claim 15 wherein the at least one encrypted given session packet was received from the second network.

* * * * *